(12) United States Patent
Bombardier

(10) Patent No.: US 6,659,566 B2
(45) Date of Patent: Dec. 9, 2003

(54) CARGO CARRYING COMPARTMENTS OF AN ALL TERRAIN VEHICLE

(75) Inventor: Charles Bombardier, Orford (CA)

(73) Assignee: Bombardier Inc., Valcourt (CA)

(*) Notice: Subject to any disclaimer, the term of this patent is extended or adjusted under 35 U.S.C. 154(b) by 43 days.

(21) Appl. No.: 09/950,926

(22) Filed: Sep. 13, 2001

(65) Prior Publication Data

US 2002/0033287 A1 Mar. 21, 2002

Related U.S. Application Data

(60) Provisional application No. 60/232,572, filed on Sep. 13, 2000.

(51) Int. Cl.$^7$ .............................. B60P 1/16; B60R 9/06
(52) U.S. Cl. .................. 298/22 R; 298/17 R; 224/401; 296/37.1
(58) Field of Search .............................. 398/17 R, 19 R, 398/22 R; 296/36, 37.1, 57.1, 184; 180/37.1, 184; 224/401, 412, 413, 433, 435, 443, 452, 453, 488, 495, 504, 506

(56) References Cited

U.S. PATENT DOCUMENTS

| | | | | |
|---|---|---|---|---|
| 3,647,097 A | * | 3/1972 | Skaggs | 414/494 |
| 4,126,357 A | * | 11/1978 | Day | 298/1 A |
| 4,135,761 A | | 1/1979 | Ward | |
| 4,247,030 A | | 1/1981 | Amacker | 224/273 |
| 4,270,786 A | * | 6/1981 | Mattox | 398/3 |
| 4,277,008 A | | 7/1981 | McCleary | 224/273 |
| 4,349,138 A | * | 9/1982 | Bruhn | 224/443 |
| 4,522,442 A | | 6/1985 | Takenaka | |
| 4,619,476 A | | 10/1986 | Kawasaki | |
| 4,648,617 A | | 3/1987 | Hannappel | 280/289 A |
| 4,660,880 A | | 4/1987 | Bensch | |

(List continued on next page.)

OTHER PUBLICATIONS

2002 Arctic Cat Brochure, 2001.
QuadRunner LT–F250T, 1996.
Polaris Sportsman 500, 2000.
Polaris Recreational Vehicles, 2002.
VTT, 2001.
VTT, 2000.
Kawasaki, Vehicules Tout Terrain, 2000.
2000 Honda Sport ATVS, Jul. 1999.
Suzuki QuadRunners, 2000.
Arctic Cat, Vos Horizons, 2000.
Honda Utility ATVS, 2000.
Honda Fourtrax, 1999.
Honda Utility ATVs, 1999.
Polaris, All Terrain Vehicles, 1999.
Yamaha ATVS, 1999.

(List continued on next page.)

*Primary Examiner*—Joseph D. Pape
*Assistant Examiner*—Paul Chenevert
(74) *Attorney, Agent, or Firm*—Pillsbury Winthrop LLP

(57) ABSTRACT

An all-terrain vehicle (ATV) includes various storage compartments so that the weight loaded onto the vehicle may be evenly distributed between the front and rear suspension of the ATV. The ATV is capable of hauling a variety of loads over various terrains. The ATV contains a rear storage compartment, at least two side storage compartments, a front storage compartment, and a front rack to enable the rider to carry or attach a wide variety of loads onto the ATV without causing the vehicle to overturn or flip up due to the additional weight. Additionally, the ATV may also include a tree guard positioned on each side of the ATV to protect the rear storage and side compartments and to prevent cargo on the rear storage compartment from being dislodged by trees that might protrude into the rider's path. Additionally, the rear storage compartment may be pivotable and a piston may be provided to assist with the pivoting, and the walls of the rear cargo box may also fold down to enable the hauling of an additional variety of loads.

41 Claims, 19 Drawing Sheets

U.S. PATENT DOCUMENTS

| | | | |
|---|---|---|---|
| 4,706,770 A | 11/1987 | Simon | 180/24.02 |
| 4,726,439 A | 2/1988 | Iwao et al. | |
| D298,811 S | 12/1988 | Morita | D12/107 |
| 4,789,195 A | 12/1988 | Fletcher | |
| 4,802,682 A | 2/1989 | Yasuji | |
| 4,821,825 A | 4/1989 | Somerton-Rayner | 180/22 |
| 4,826,057 A * | 5/1989 | Yamada | 224/412 |
| D305,999 S | 2/1990 | Ueda et al. | D12/107 |
| 5,060,748 A * | 10/1991 | Iwai et al. | 180/215 |
| 5,064,016 A | 11/1991 | Iwai et al. | |
| 5,076,387 A | 12/1991 | Oka | 180/215 |
| 5,083,632 A | 1/1992 | Saito et al. | |
| D324,666 S | 3/1992 | Haag et al. | D12/155 |
| D325,360 S | 4/1992 | Saito et al. | D12/107 |
| 5,174,622 A | 12/1992 | Gutta | 296/77.1 |
| 5,224,636 A * | 7/1993 | Bounds | 224/510 |
| 5,267,780 A * | 12/1993 | Friesen et al. | 298/17 B |
| 5,327,989 A | 7/1994 | Furuhashi et al. | 180/248 |
| 5,360,259 A * | 11/1994 | Lemberger | 298/19 V |
| 5,421,645 A | 6/1995 | Young | |
| 5,433,357 A | 7/1995 | Alliff | 224/510 |
| D364,590 S | 11/1995 | Yamashita | D12/15 |
| 5,476,146 A | 12/1995 | Brown | 469/24 |
| 5,480,214 A * | 1/1996 | Rogers | 298/17.6 |
| 5,513,868 A | 5/1996 | Barr | |
| 5,558,260 A * | 9/1996 | Reichert | 224/413 |
| 5,597,067 A * | 1/1997 | Yoneyama | 296/57.1 |
| 5,597,211 A * | 1/1997 | Golden | 298/17.6 |
| 5,615,922 A | 4/1997 | Blanchard | |
| 5,816,462 A | 10/1998 | Brantley | 224/570 |
| 5,819,390 A | 10/1998 | Clare | |
| D405,029 S | 2/1999 | Deutschman | D12/107 |
| 5,876,005 A | 3/1999 | Vasconi | |
| 5,878,929 A | 3/1999 | Leonard | |
| 6,003,923 A | 12/1999 | Scott et al. | |
| 6,016,943 A | 1/2000 | Johnson et al. | 224/401 |
| 6,029,750 A | 2/2000 | Carrier | 169/52 |
| 6,030,018 A | 2/2000 | Clare et al. | |
| D422,938 S | 4/2000 | Molzon et al. | D12/1 |
| D427,109 S | 6/2000 | Molzon et al. | D12/1 |
| 6,079,741 A | 6/2000 | Maver | |
| 6,129,401 A | 10/2000 | Neag et al. | |
| 6,142,549 A | 11/2000 | Clare et al. | |
| D436,557 S | 1/2001 | Selby et al. | D12/14 |
| 6,179,180 B1 | 1/2001 | Walker | |
| D439,548 S | 3/2001 | Kouchi et al. | D12/1 |
| D439,549 S | 3/2001 | Shambeau et al. | D12/14 |
| 6,209,941 B1 * | 4/2001 | Cross | 296/37.1 |
| 6,237,211 B1 | 5/2001 | Clare et al. | |
| 6,237,990 B1 | 5/2001 | Barbier et al. | |
| D445,066 S | 7/2001 | Hinklin et al. | D12/1 |
| 6,296,163 B1 * | 10/2001 | Kitao et al. | 224/401 |
| 6,378,748 B1 * | 4/2002 | Cox | 224/511 |
| 6,461,095 B1 * | 10/2002 | Puska | 414/462 |
| 6,533,339 B1 | 3/2003 | Bettin et al. | |
| 2002/0027038 A1 | 3/2002 | Rioux et al. | 180/292 |

OTHER PUBLICATIONS

"Super All–Terrain Test CAGED GRIZZLY!," Dirt Wheels, Nov. 1999, pp. 41–45.
"Mule 550–2500–2500–2510–2520," Kawasaki Catalog.
"Polaris, 1999 Big Boss 500 6x6," www.polarisindustries.com/product.cfm?Product=175, Oct. 8, 1999, 1 page.
"Polaris, 1999 Big Boss 500, 6x6," www.polarisindustries.com/cat.cfm?SubcatID=43, Oct. 8, 1999, 3 pages.
"Polaris RANGER," www.polarisindustries.com/product.cfm?PRODUCT=82, Oct. 8, 1999, 2 pages.
"Home & Shop Journal," Popular Mechanics, May 1996, p. 105.
"Over the Bars," Dirt Wheels, Dec. 1999, p. 10.
"Argo 6x6 Vanguard/Vanguard 2," ARGO Models—Vanguard, www.argoatv.com/argo–models–vanguard.html, Jun. 5, 2000.
Photographs of Yamaha Pro Hauler, 1989, 4 sheets.

* cited by examiner

CARGO CARRYING COMPARTMENTS OF AN ALL TERRAIN VEHICLE

This application claims priority to Provisional patent application Ser. No. 60/232,572 filed on Sep. 13, 2000, the content of which is hereby incorporated by reference in its entirety. This application is also related to patent application Ser. No. 09/057,652, entitled "ALL TERRAIN VEHICLE" filed on Apr. 9, 1998, the content of which is hereby incorporated by reference in its entirety and to Patent Application Ser. No. 09/339,517, entitled "STRADDLE-TYPE ALL TERRAIN VEHICLE WITH PROGRESSIVE DIFFERENTIAL" filed on Jun. 24, 1999, the content of which is hereby incorporated by reference in its entirety.

BACKGROUND OF THE INVENTION

1. Field of Invention

The present invention relates to the field of all terrain vehicles, and more particularly, the invention relates to a vehicle including storage compartments that are capable of hauling a variety of loads over various terrains.

2. Description of Related Art

During the last decade or so, the popularity of all terrain vehicles (also referred to as "ATV's") has greatly increased. These types of vehicles are indeed very practical and versatile since they may be used for work or leisure related tasks. By virtue of their relatively compact nature, their great mobility and their traction, they are capable of maneuvering over all types of surfaces, from the common back yard to more challenging off-the-road terrain. Since ATVs are also fairly powerful, these vehicles may be used to pull or push various objects such as a trailer or a snowplow.

FIG. 1 illustrates a saddle-type vehicle 2 conventionally found in the prior art. The vehicle 2 comprises four wheels 10 mounted to a frame 12. The front wheels are steerable through a steering member 14 connected to a steering mechanism (not shown). The frame 12 comprises an upper member 12' extending on an upper portion of the vehicle 2 above a power unit 20 and a lower member 12" extending on a lower portion thereof. A fuel tank 16 and a seat 18 are disposed on an upper portion of the frame 12. The power unit 20, which represents one of the heaviest components of the vehicle, is typically mounted in a central portion of the vehicle, usually below the fuel tank 16 and at a front portion of the seat 18. The vehicle 2 includes a rear storage rack 22 and a front storage rack 24, both of which are supported by the frame 12. However, the load capacities of the storage racks 22, 24 are limited. Furthermore, the shape and location of some storage racks, including the storage racks 22, 24 can adversely affect the vehicle's handling and stability.

Another conventional four wheeled ATV is designed with a flat bed rear cargo support attached to the rear of the vehicle, above the rear wheels and behind the seat. However, this ATV has a tendency to overturn when loaded with heavy rear cargoes and/or is driven over uneven off-road terrain, because its design is incapable of compensating for the dynamic force created on the vehicle due to the load. It is believed that this inability to handle a heavy load is due, at least in part, to the fact that the wheel base of these vehicles is too short. Other factors that may contribute to the instability of this prior art vehicle relates to the poor weight distribution between the front and rear wheels, and the suspension design. One such prior art vehicle that is susceptible to overturning is the PROHAULER™, which is manufactured by YAMAHA™. Moreover, while other ATVs may have greater load capacities, such as about 800 lbs., they generally require three sets of wheels to support such a load. Also, prior art ATVs require multiple steps to secure and unsecure the flat bed rear cargo support.

Other vehicle designs are shown in U.S. Design Pat. Nos. D445,066; D422,938; D439,549; D439,548; D427,109; D436,557; and D364,590. Each of these designs is capable of carrying a load in a rear bed, or box structure. These vehicles, however, are not considered to be true ATV's since they provide seating for a passenger, either with two separate seats (which are side by side) or with a long bench-style seat. Additionally, these vehicles share common characteristics, which are disadvantageous for purposes of operating as an ATV. In particular, the majority of these vehicles have a relatively low ground clearance, which prevents them from traversing rough terrain in true all-terrain conditions. However, those vehicles that are provided with a relatively high ground clearance also have a high center of gravity. The high ground clearance may allow for the traversal of rough terrain, but the high center of gravity makes these vehicles unstable while traversing this terrain.

Furthermore, these vehicles have a decreased maneuvering capability, as compared to other ATV's. In particular, the turning radius is significantly increased. Additionally, the vehicles have a relatively wide stance due to their two person seating arrangement. The wide stance decreases the vehicle's ability to access some terrain features and makes it prone to hang-ups when traversing rough terrain, especially when coupled with a low ground clearance.

Of course, these vehicles are able to carry relatively heavy loads, which makes them advantageous for certain applications. However, a high load capacity often is provided for by or necessitates an additional set of wheels at the rear of the vehicle. An extra set of wheels further decreases the vehicle's maneuverability and increases the overall weight of the vehicle. Additionally, when loaded, it has been found that the steerability of these vehicles is degraded due; at least in part, to the inability to appropriately distribute the load between the front and rear wheels of the vehicle.

Another vehicle is disclosed in U.S. Pat. No. 5,076,387, which includes a storage receptacle that is integrally formed with a rear fender. The storage receptacle is formed as a recess within the rear fender. The recess extends below upper frame members of the frame of the vehicle. Additionally, the recess extends forwardly within the rear fender to a position beneath a seat of the vehicle. In this manner, the storage receptacle is not moveable, in particular pivotable, so as to facilitate removal of load therefrom.

SUMMARY OF THE INVENTION

It is therefore an aspect of the invention to overcome the deficiencies noted above with respect to prior art ATVs, for example, by providing a four-wheeled ATV with a relatively high load capacity, while maintaining substantially all ATV functionality.

It is another aspect to provide an ATV with a relatively high load capacity, while maintaining a high degree of maneuverability.

It is another aspect to provide an ATV that has a high ground clearance and a low center of gravity when loaded.

It is yet another aspect to provide an ATV that has a distribution of unloaded weight providing 50% of the weight of the vehicle on the front wheels and 50% of the weight on the rear wheels.

It is another aspect to provide an ATV with a high load capacity that has four-wheel drive capability.

It is yet another aspect to provide an ATV with a high load capacity that maintains steerability when loaded.

It is another aspect to provide an ATV with a box bed situated at a rear portion thereof such that the bed is easily tilted by a user to dump a load from the box bed.

It is another aspect to provide an ATV with a rear storage compartment having a high load capacity, without the tendency of the ATV to overturn when traversing over various terrain.

Another aspect of the invention is to provide additional storage compartments formed on the fenders of the ATV. These additional storage compartments may be formed integrally with or attached to the fenders.

A further aspect of the invention is to provide an ATV having a rear storage compartment that can be easily (un) secured and in which the load can be deposited a safe distance away from the rear of the ATV.

Other aspects of the invention relate to providing a tree guard, preferably connected to the frame and/or the floorboards of the ATV, that can protect the rear storage compartment from damage caused by traveling close to trees. The tree guard may also provide a support for the additional side storage compartments that are integrally formed with or separately attached to the front and/or rear fenders of the ATV.

In accordance with one embodiment of the invention a straddle-type vehicle is provided that includes a frame, a pair of front wheels suspended from a front portion of the frame, and a pair of rear wheels suspended from a rear portion of the frame and defining a rear axle. The vehicle also includes a power unit mounted on the frame and a rear storage compartment positioned over the rear portion of the frame. The rear storage compartment has a center of gravity positioned over the rear axle.

In accordance with another embodiment of the invention provides a straddle-type vehicle including a frame, a pair of front wheels suspended from a front portion of the frame, and a pair of rear wheels suspended from a rear portion of the frame. The vehicle also includes a power unit mounted on the frame, a seat pivoted over the power unit, and a rear storage compartment positioned over the rear portion of the frame. The vehicle further includes a front storage rack and compartment positioned adjacent the front wheels and a side compartment on each side of the seat. Each of the side compartments is positioned between the front and rear wheels. The rear storage compartment, the front storage rack and compartment and the side compartment have a combined load capacity of about 800 lbs.

Yet another embodiment of the invention provides a straddle-type vehicle including a frame, a pair of front wheels suspended from a front portion of the frame, and a pair of rear wheels suspended from a rear portion of the frame. The vehicle also includes a power unit mounted on the frame and at least one side compartment structure coupled to the frame on a lateral side of the frame between the pairs of front and rear wheels. The side compartment structure is configured to define a storage receptacle.

Other aspects, objects and features of the invention will become apparent by reference to the following specification and to the drawings.

BRIEF DESCRIPTION OF THE DRAWINGS

The following is a description by way of preferred embodiments, reference being made to the following drawings, in which.

DETAILED DESCRIPTION OF PREFERRED EMBODIMENTS

Figure 1:
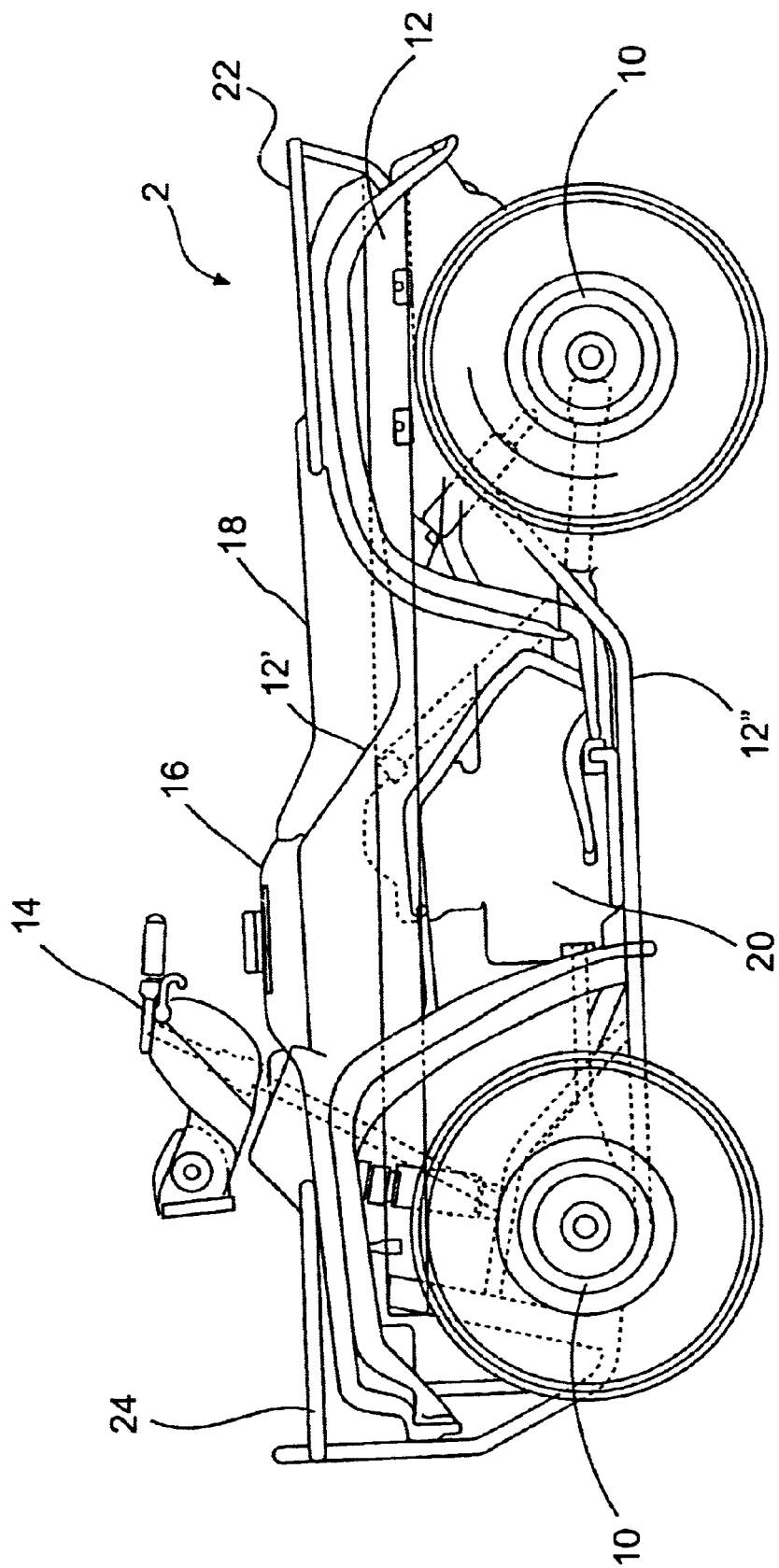
FIG. 1 is a side view of saddle-type vehicle according to the prior art.
Figure 2:
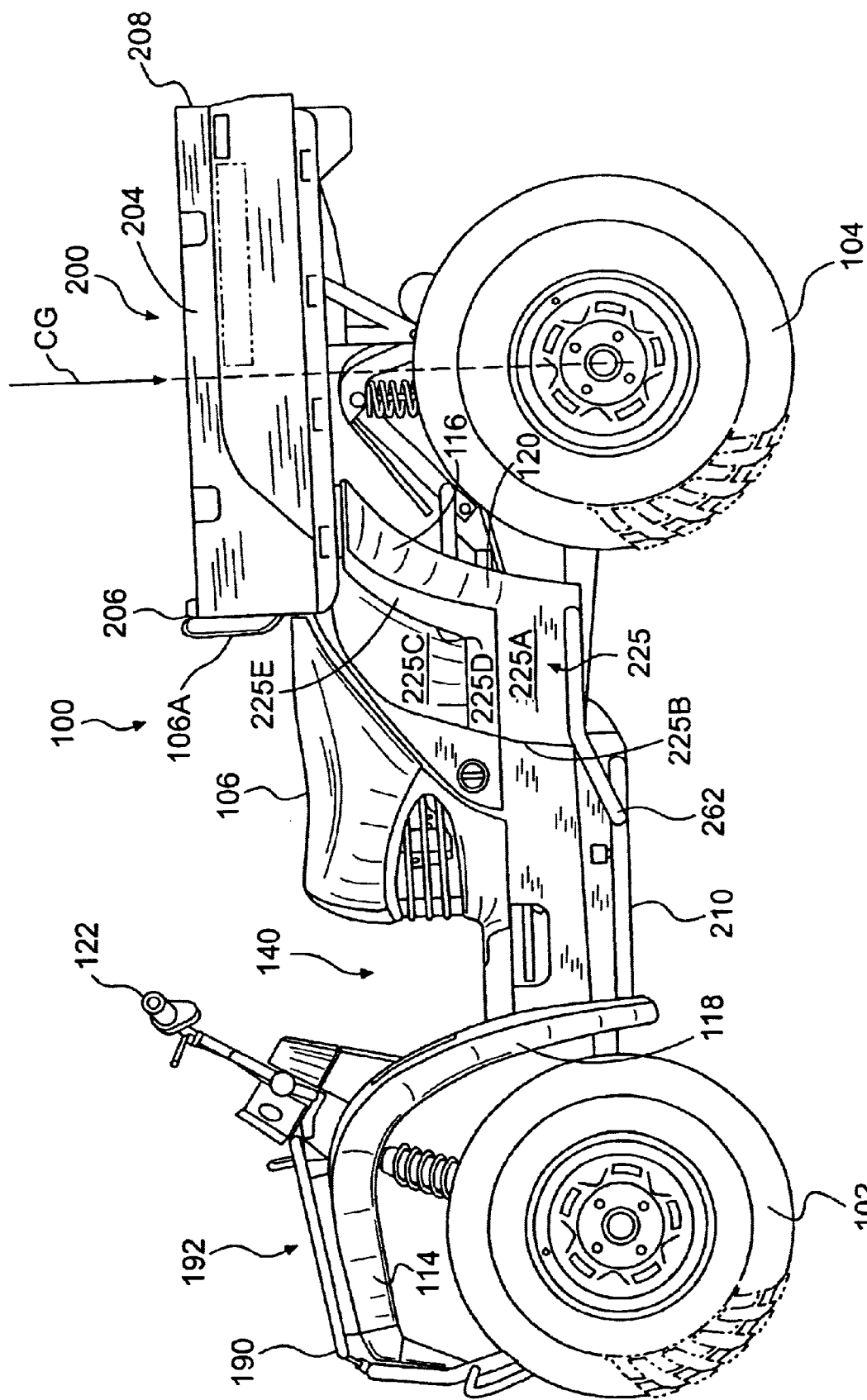
FIG. 2 is a side view of an ATV according to one preferred embodiment of the present invention.
Figure 3:
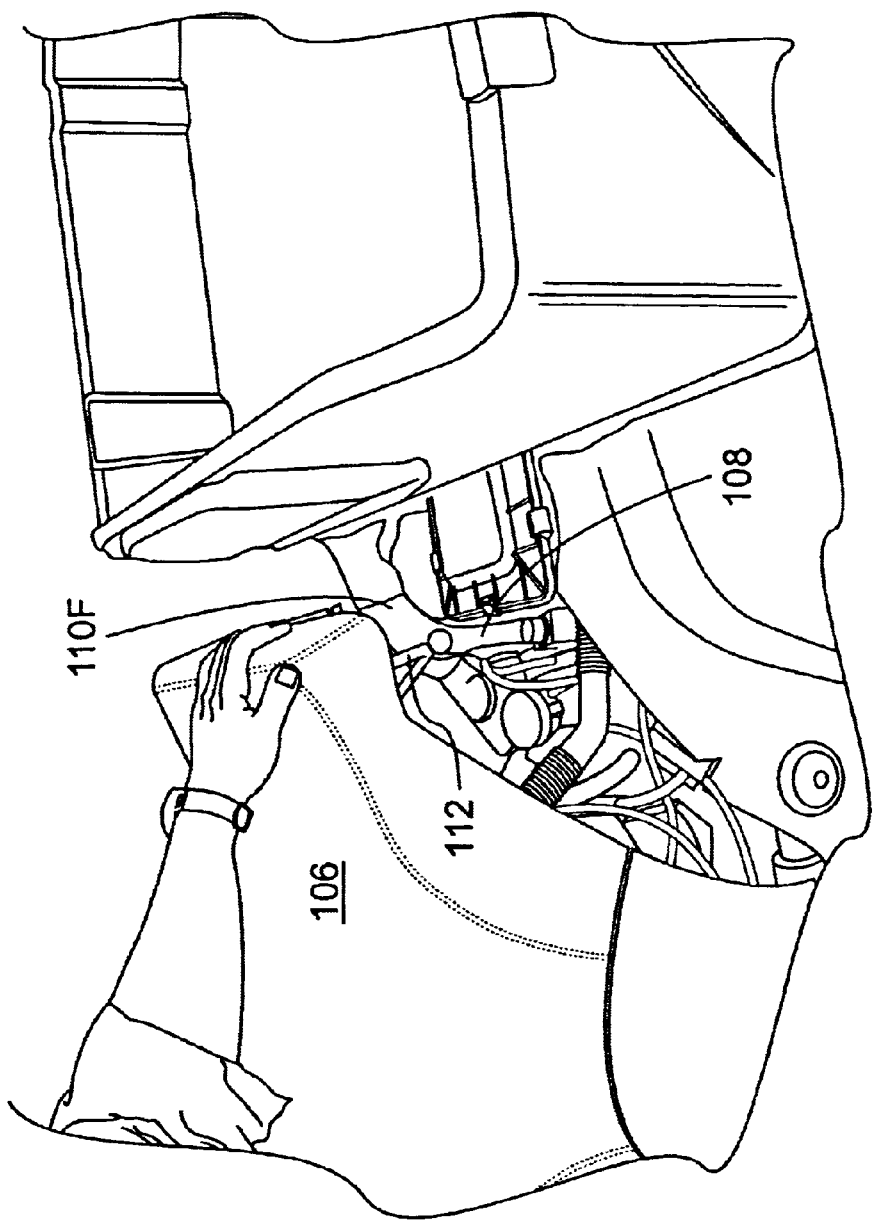
FIG. 3 is a partial top perspective view from the left side of the ATV shown in FIG. 2, with the seat in the open position.

A preferred embodiment of an ATV 100 according to the present invention is illustrated in FIG. 2. The ATV 100 includes a pair of front wheels 102 and a pair of rear wheels 104. The front and rear wheels 102, 104 are suspended from a frame, which is more clearly visible in other FIGS. The ATV 100 also includes a seat 106 that is pivotally mounted to the ATV 100, as shown in FIG. 3, to allow access to a power unit, e.g., an engine. The seat may also have a back seat rest portion 106A (see FIGS. 2 and 5). As shown in FIG. 3, a fixed pin 108 is mounted on a front main frame 110F of the ATV 100. The pin 108 is provided with an enlarged head portion that is received within a receiving orifice provided in the bottom of the seat 106. A lever 112 can be activated in a known manner to force a retaining member within the orifice to release the seat 106.

Referring back to FIG. 2, the ATV 100 includes a front fender 114 over the front wheels 102 and a rear fender 116 over the rear wheels 104. A front storage rack 190 and cover 192 are provided above the front fender 114. A front storage compartment (not shown) is below the cover 192. The front storage rack 190, cover 192 and front storage compartment are described more fully in the U.S. patent application Ser. No. 09/057,652 cross-referenced above. Front and rear mudguards 118, 120, respectively, extend downwardly from the front and rear fenders 114, 116. A pair of handlebars 122 are provided to steer the front wheels 102.

Figure 2A:
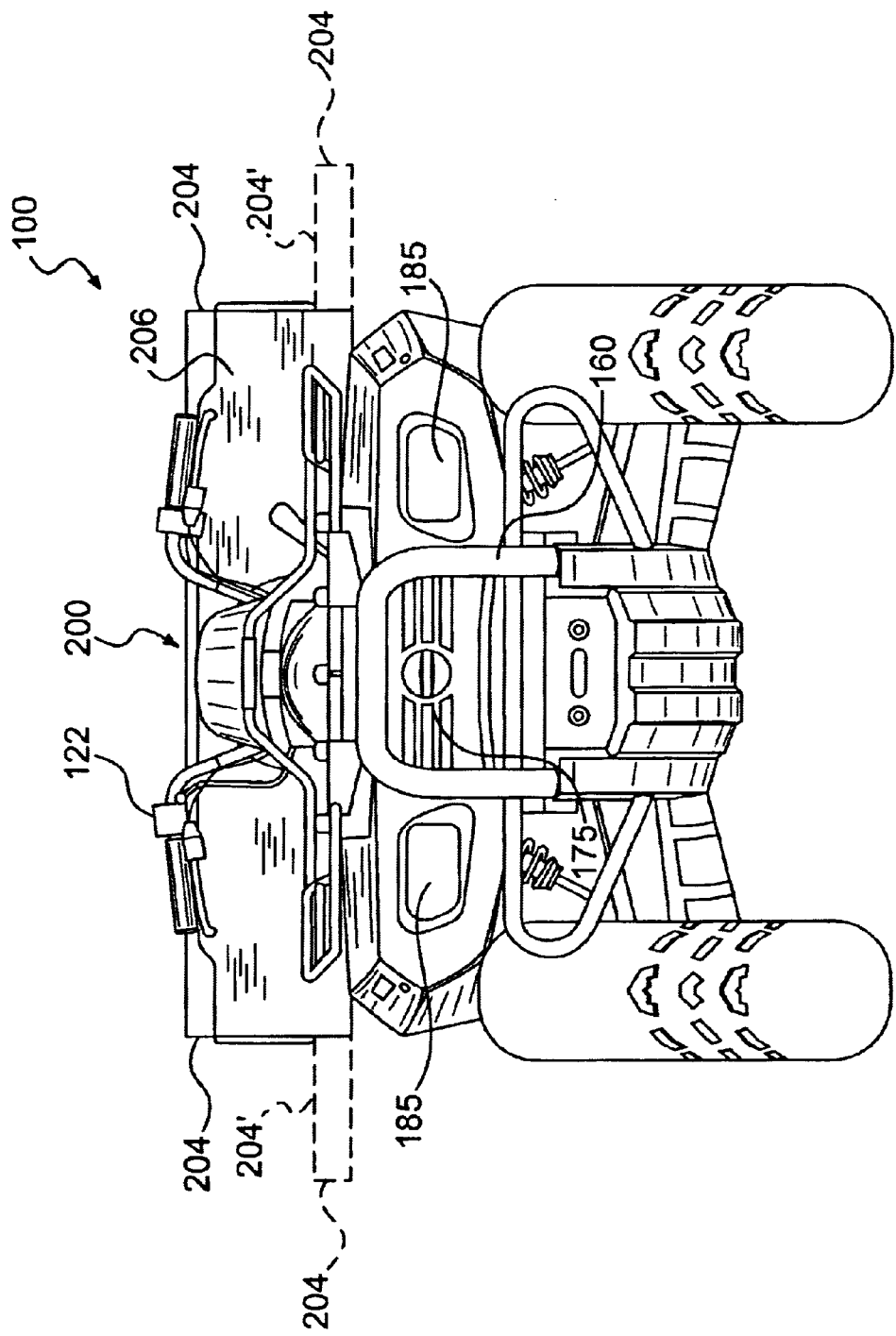
FIG. 2A is a front view of the ATV shown in FIG. 2.

The ATV 100 has a virtually unobstructed walk-through clearance area 140 located in front of the seat 106. The clearance area 140 facilitates a rider's entrance on to and exit from the ATV 100, as can be more easily seen in FIGS. 2 and 5. The clearance area 140 may also be used as additional storage area to permit the rider to position an item in a convenient area in front of the rider for easy and quick retrieval, such as snacks or other items, as described and illustrated (FIGS. 15–17) in the U.S. patent application Ser. No. 09/057,652 cross-referenced above. Further, as shown in FIG. 2A, the front portion of the ATV 100 also includes a bumper 160, a front grille 175 and headlamps 185. In addition, the cross-referenced U.S. patent application Ser. No. 09/057,652 includes a more complete description of other details and advantages of the clearance area, in addition to other general features of the ATV 100. Although the present invention is described in reference to a step-through vehicle, the present invention may be utilized with other types of recreational vehicles.

Further, as shown in FIG. 2, the ATV 100 includes a rear storage compartment 200 that is positioned above the rear wheels 104 and behind the seat 106. The storage compartment 200 may be manufactured using a rotomolding process, which is known in the art. Although the rotomolding process can produce a storage compartment that is sturdy, strong, and durable, it is also possible to manufacture the storage compartment 200 using another process, such as injection molding. The rear storage compartment 200 includes a generally flat floor portion 202 (better visible in the top plan view of FIG. 4), side wall portions 204, a front wall portion 206 and a rear wall portion 208. The wall portions, 204, 206, 208 extend upwardly away from the floor portion 202 to define a compartment, as better shown in FIG. 4. The rear wall portion 208 may be pivotably connected to the bottom or side wall portions 202, 204, like a tailgate. A pair of retaining members 209 (FIG. 12) hold the rear wall portion 208 in the upright position.

It is also contemplated that the storage compartment 200 may be in the form of a substantially flat bed. For this embodiment (not shown), it is contemplated that the wall portions 204–208 may be significantly reduced in height, or eliminated altogether. Alternatively, one or more of the wall portions, for example, the front wall portion 206, may remain, while other wall portions (e.g., 204, 208) are eliminated.

Figure 4:
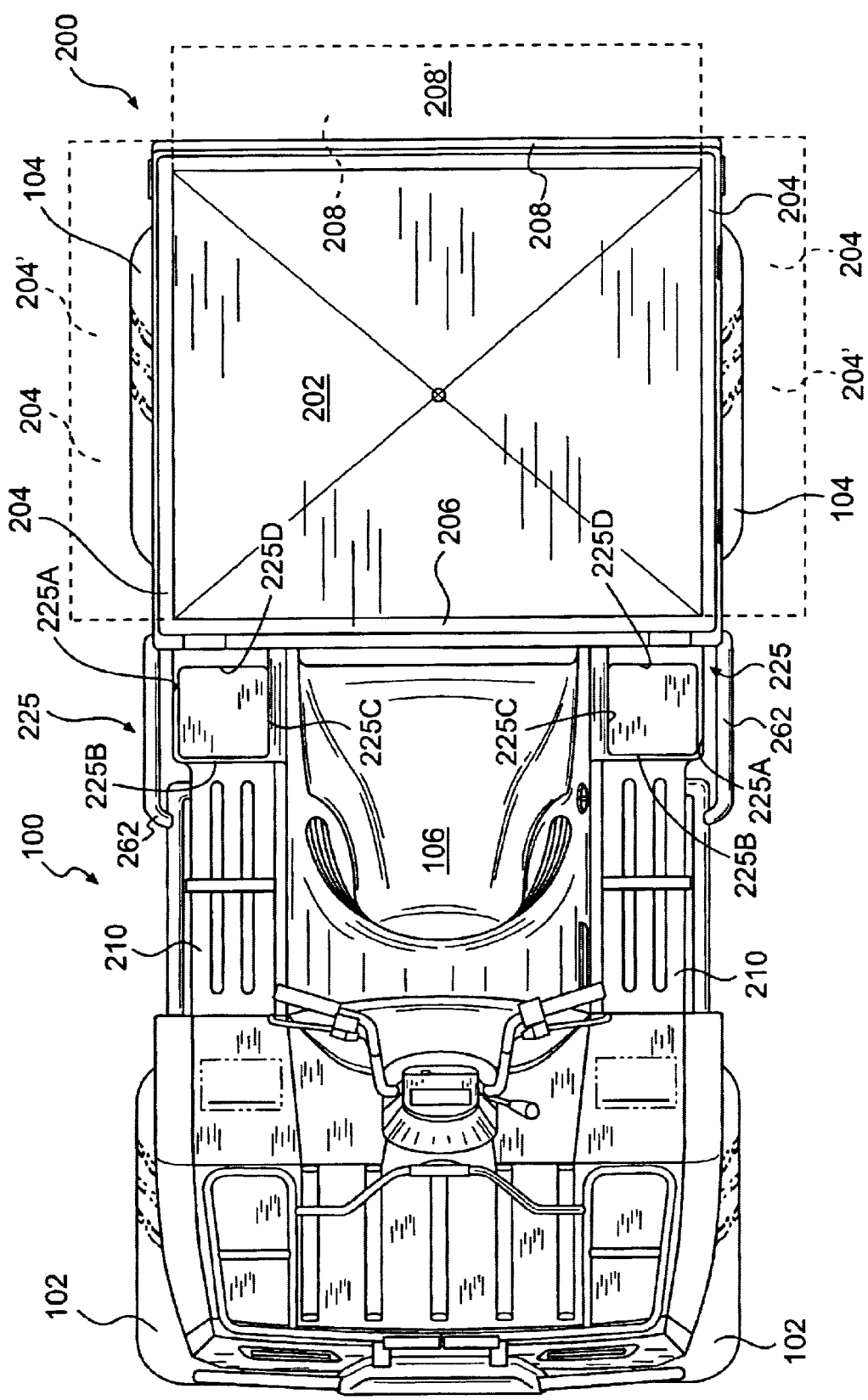
FIG. 4 is a top plan view of the ATV shown in FIG. 2.

It is also contemplated that the wall portions 204–208 may be detachable from the flat floor portion 202. In this manner, the rear storage compartment 200 may provide the box-type arrangement shown in FIG. 2, and be convertible into a flat bed arrangement. For this embodiment, it is contemplated that the wall portions 204–208 may be entirely removable, or may be pivotally connected at bottom edges thereof to the flat floor portion 202 so as to be pivoted from upright arrangements such as shown in FIG. 2 to either horizontally extending positions or depending positions relative to the flat floor portion 202, such as shown in FIGS. 2A and 4. It is noted that it may be advantageous to provide a connection of the wall portions 204–208 such that the wall portions are pivotable into a horizontally extending position, such that a horizontal supporting surface is provided by the flat floor portion 202 and substantially flat upwardly facing surfaces 204', 208' of the wall portions 204–208.

Figure 5:
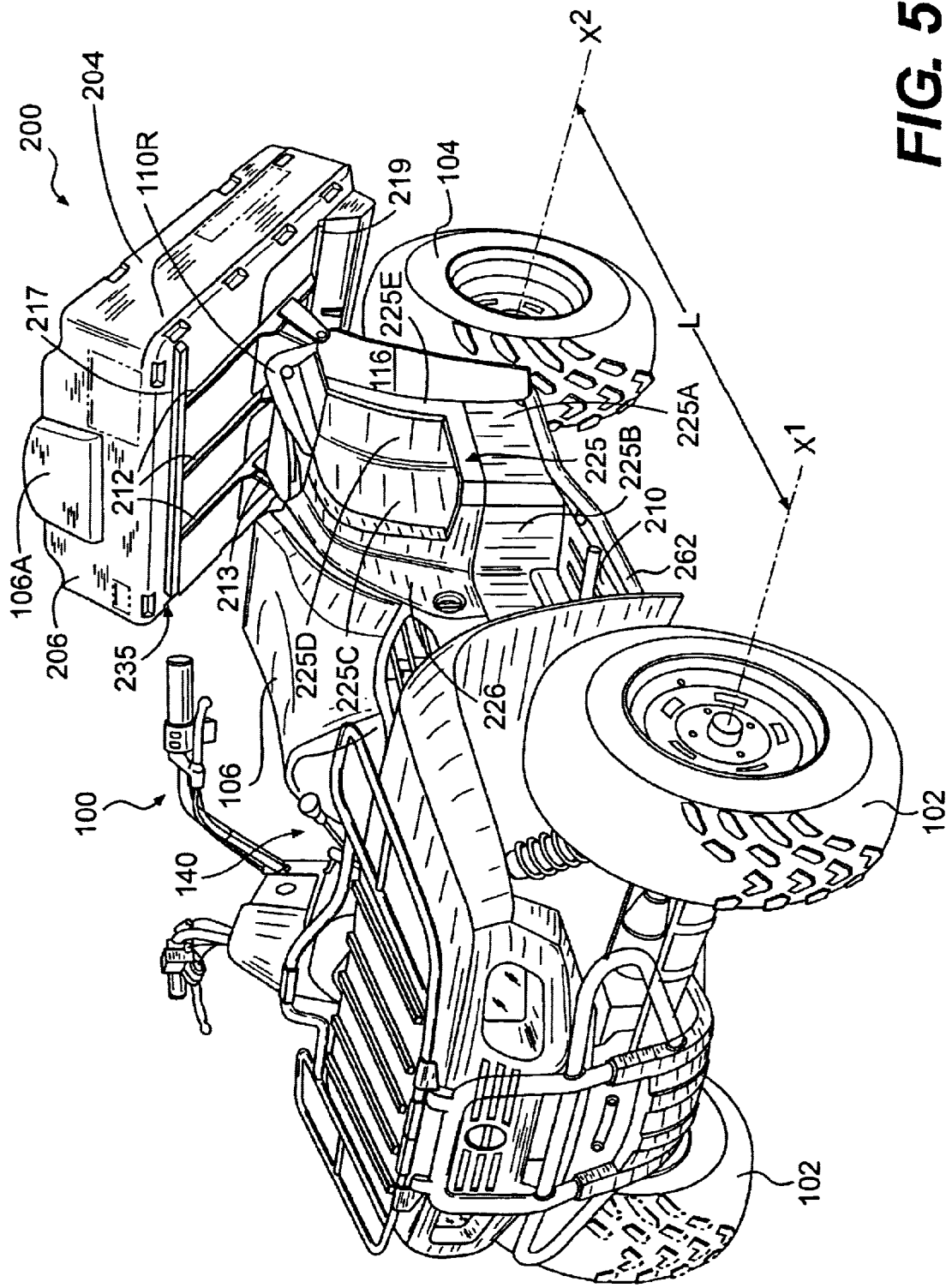
FIG. 5 is a right side view of the ATV shown in FIG. 2, with the rear storage compartment in the open position.
Figure 6:
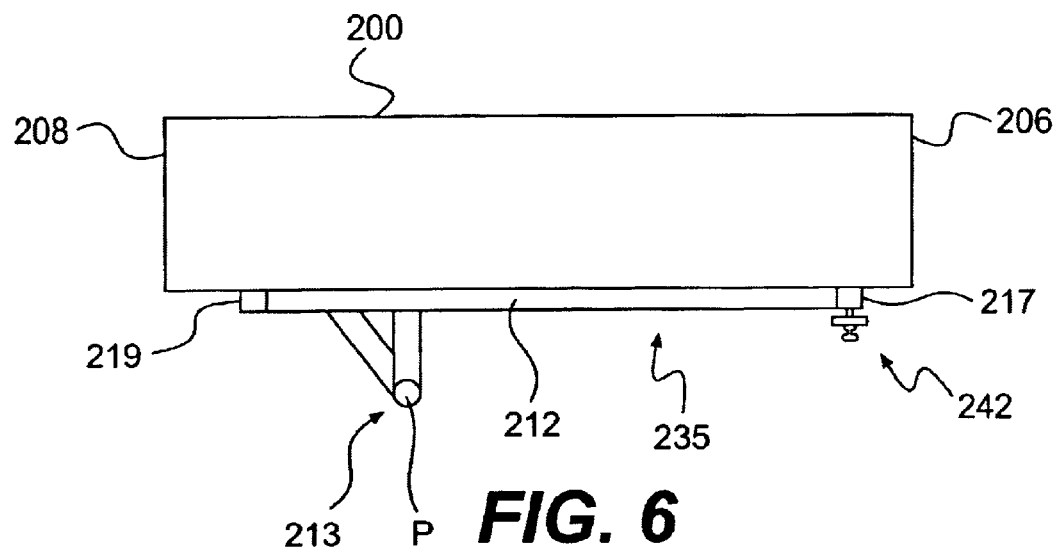
FIGS. 6 and 7 are schematic views illustrating a pivoting operation of the rear storage compartment.
Figure 7:
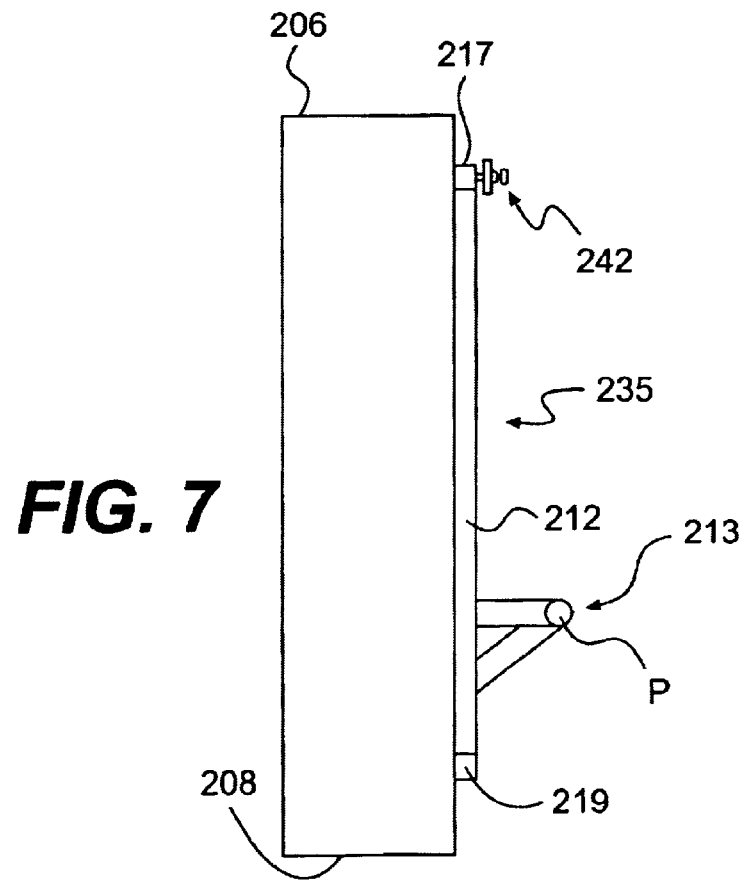
Figure 8:
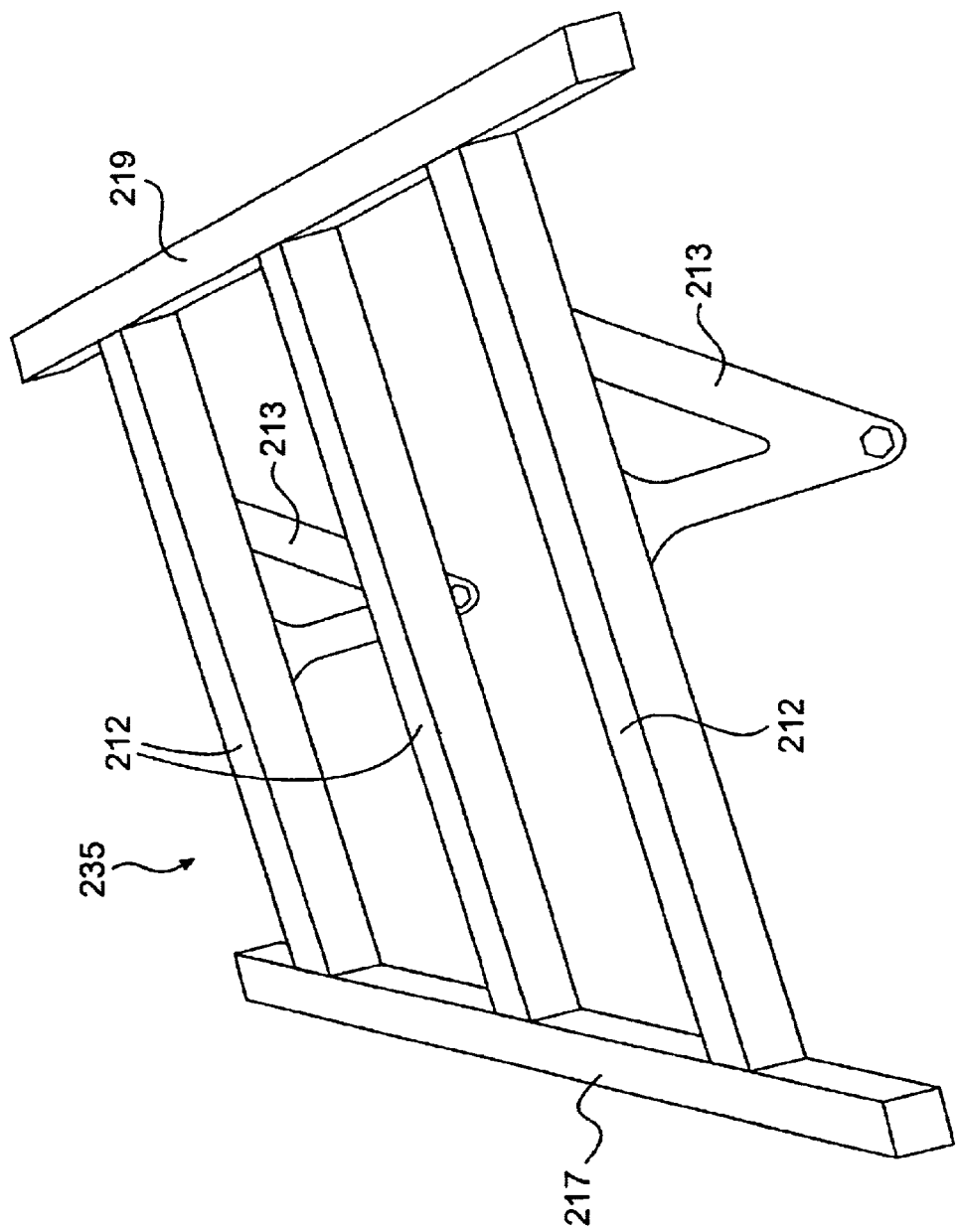
FIG. 8 is a side perspective view of a pivoting frame on which the rear storage compartment is mounted.

As shown in FIG. 5, the rear storage compartment 200 is capable of pivoting from the closed position shown in FIG. 2 to an open or unloading position. The mechanism that allows for such pivoting will be discussed in relation to FIGS. 6–8. FIGS. 6 and 7 are schematic views showing the rear storage compartment 200 attached to a pivoting frame 235. FIG. 6 corresponds to the position of the rear storage compartment 200 shown in FIG. 2, and FIG. 7 corresponds to the position of the rear storage compartment 200 shown in FIG. 5. As shown in FIG. 8, the pivoting frame 235 includes longitudinal members 212 and links 213. The pivoting frame 235 also includes front and rear cross supports 217, 219. The longitudinal members 212 provide rigidity to the pivoting frame 235. As shown in FIG. 5, the links 213 are coupled to a rear main frame 110R.

As cargo is being unloaded from the rear storage compartment 200, the pivoting frame 235 pivots about the rear main frame 110R such that the rear storage compartment 200 extends substantially outward from the rear of the ATV 100. Thus, the cargo is unloaded at a safe distance (equal to the length of the links 213) rearwardly away from the rear of the ATV 100. Further, an axis P about which the rear storage compartment pivots (relative to the rear main frame 110R) is located between the front and rear walls 206, 208 of the rear storage compartment 200 relatively closer to the rear wall 208. Accordingly, upon pivoting, the pivoting frame 235 pivots from the position shown in FIGS. 2 and 6 to the position shown in FIGS. 5 and 7. Any portion of the load positioned rearwardly of the pivot axis P will not be added to the force required to raise the storage compartment 200. In addition, this portion of the load to the rear of the storage compartment 200 will assist (by gravity) in lifting a portion of the load in the storage compartment that is forward of the pivot axis P. Accordingly, less effort is required to pivot the storage compartment 200.

Figure 10:
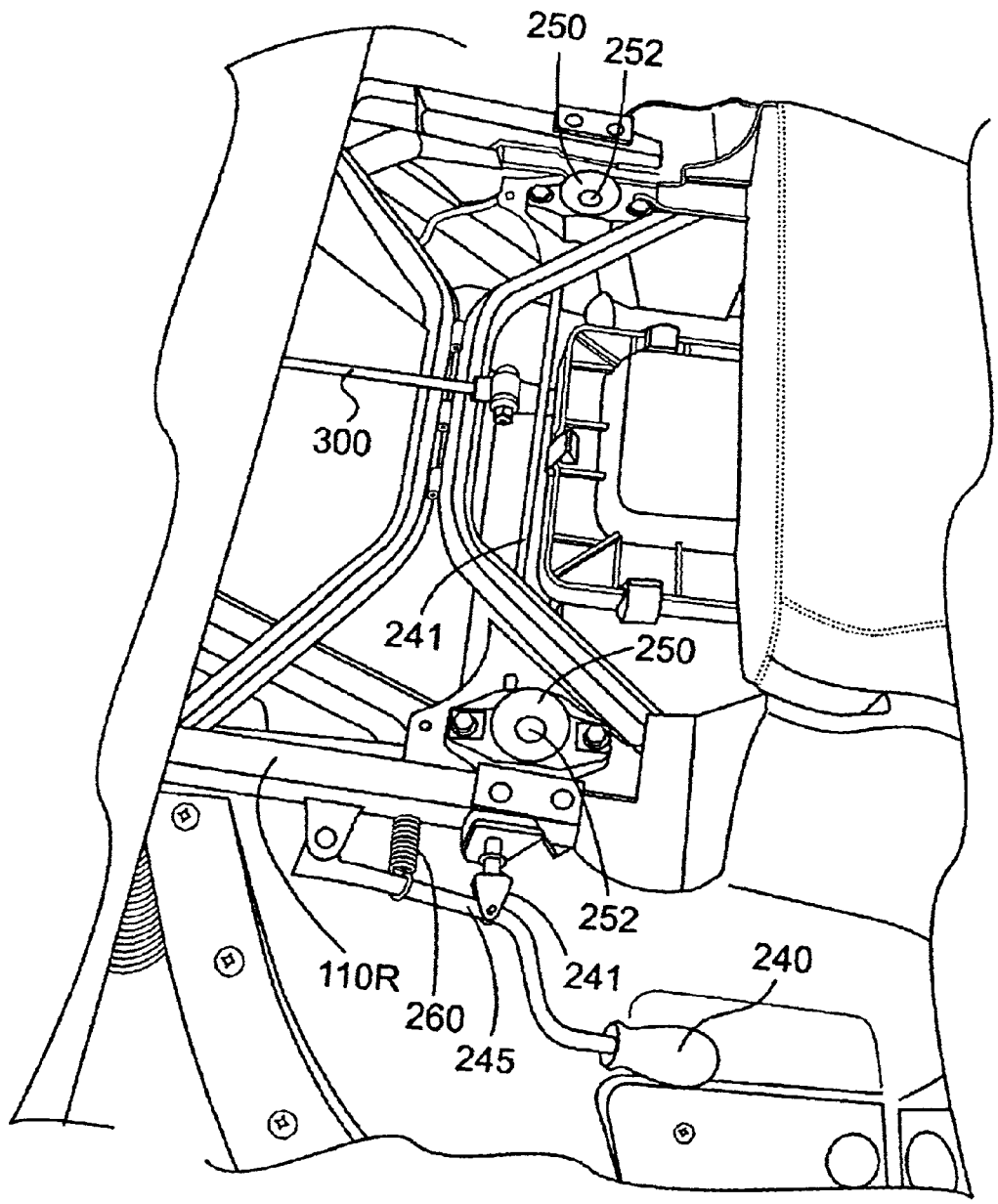
FIG. 10 is a partial top perspective view of the ATV shown in FIG. 2, with the rear storage compartment in the open position.

It is also contemplated that in order to facilitate manual operation of the storage compartment 200, a piston assembly 300 shown in FIG. 10, may be connected between the rear main frame 110R and the pivoting frame 235. The piston assembly 300 may be in the form of a hydraulic or pneumatic damper, such as a type suitable to slow movement of the storage compartment 200 relative to the main frame 110R. It is also contemplated that the piston assembly 300 may be in the form of a hydraulic or pneumatic extension cylinder, such as a type suitable to apply a force on the pivoting frame 235 as the storage compartment 200 is pivoted to the open position, shown in FIG. 7. As shown in FIG. 10, the piston assembly 300 is disposed in a substantially horizontal position. The piston assembly 300 extends as the storage compartment 200 is pivoted into the open position and retracts as the storage compartment 200 is pivoted into the closed position.

Figure 9:
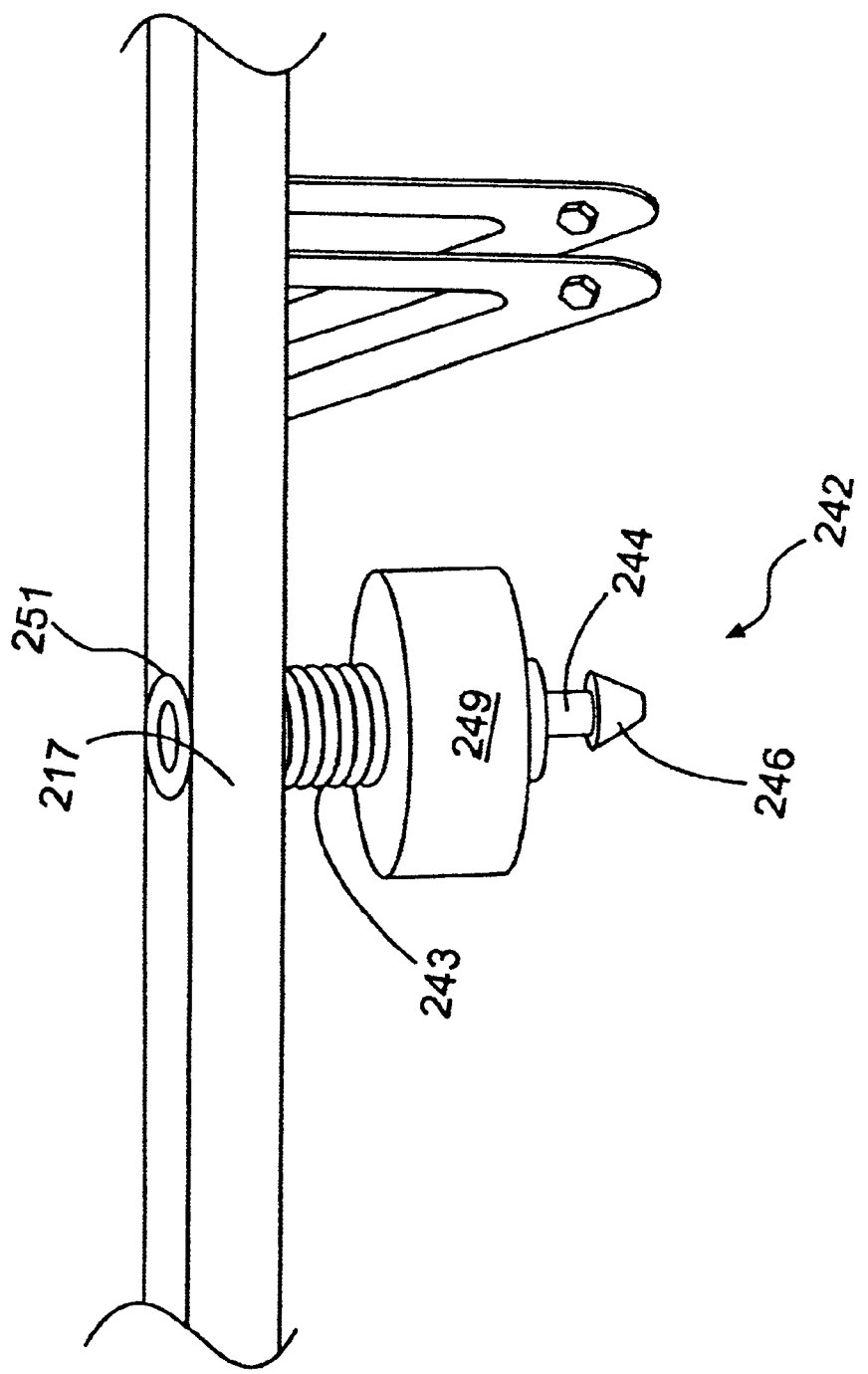
FIG. 9 is a partial left side view of the pivoting frame shown in FIG. 8, which shows one of the compliant pins.

As shown in FIG. 9, the pivoting frame 235 also includes at least one compliant pin 242 that is attached to the front cross support 217. The compliant pin 242 is shown schematically in FIGS. 6 and 7, but it is not visible in FIG. 8 since it is hidden by the cross support 217. The compliant pin 242 includes a pre-loaded spring 243 that surrounds a shaft 244 having a head in the form of a conical tapered tip 246. A rubber bumper 249 is provided between the spring 243 and the tip 246. The upper portion of the compliant pin 242 includes a bolt 251 for fastening the compliant pin 242 to the cross support member 217.

As illustrated in FIG. 10, the rear main frame 110R includes a pair of pin receptacles 250. Each receptacle 250 includes an aperture 252 and a reciprocating retaining member 254 (FIG. 11) in communication with the aperture 252. A handle 240 (FIG. 10) is provided to reciprocate the retaining members 254 to selectively lock and unlock the rear storage compartment 200. The handle 240 is connected to a first link 245 pivotably mounted to the rear main frame 110R. The first link 245 is connected to a second link 241, which is coupled with the retaining member 254 provided within each receptacle 250. A spring 260 maintains the assembly in the position shown in FIG. 10. The handle 240 may be located on either side of the ATV in a location that is easily accessible for the rider. To disengage the retaining members 254 and thereby pivot the rear storage compartment 200, the rider activates the handle 240, which transfers the motion through the linkage assembly 241 to shift each of the retaining members 254 radially away from the aperture 252 so that the retaining member 254 releases the conical tip 246 of the complaint pin 242. It is also contemplated that any other suitable handle structure can be used to reciprocate the retaining members 254.

Figure 11:
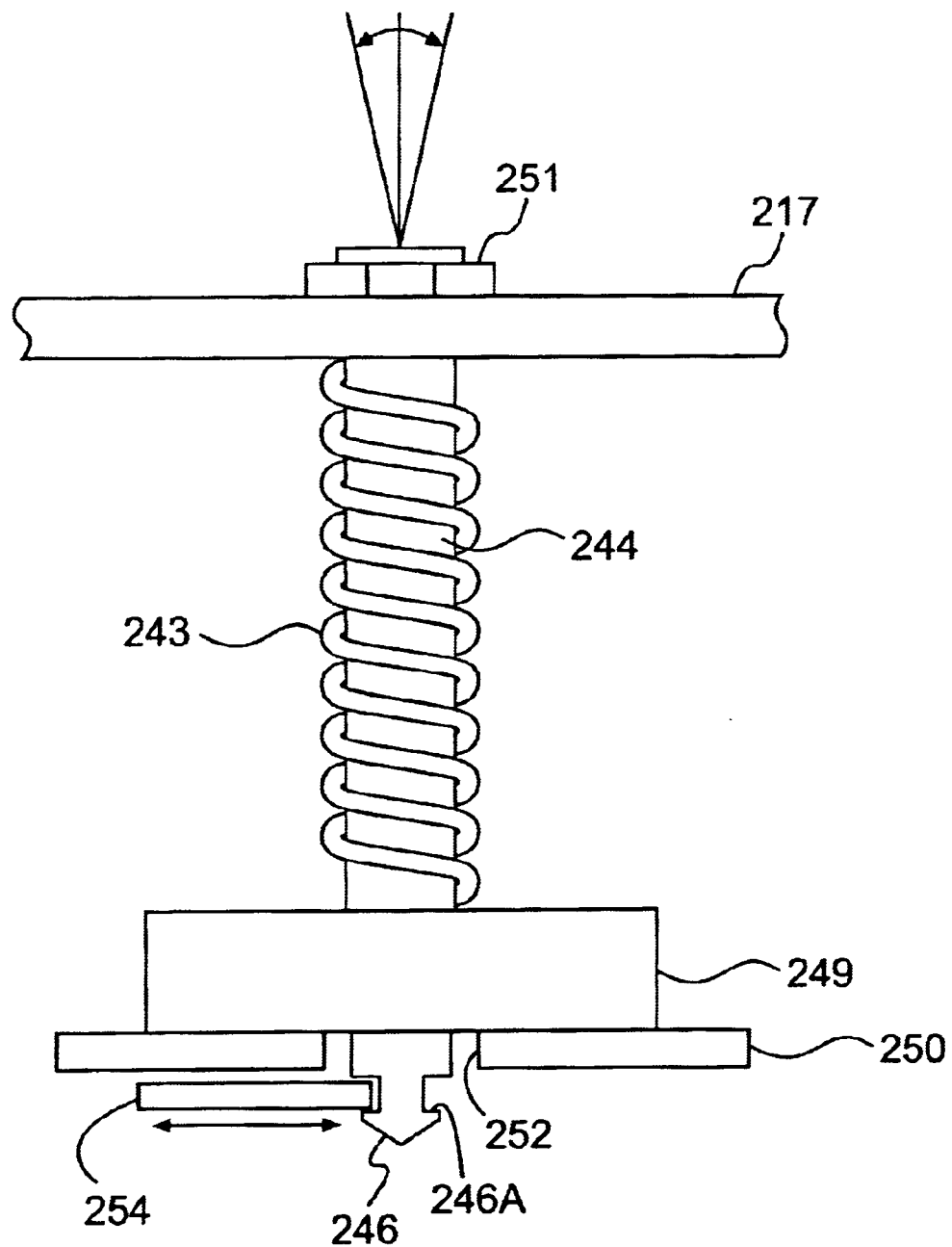
FIG. 11 is a schematic view illustrating the securing mechanism for securing the rear storage compartment to the frame of the ATV.

Referring to FIG. 11, upon pivoting the storage compartment 200 into the horizontal position, gravity or manual movement of the compartment 200 urges the tip 246 past the retaining member 254, at which point the retaining member 254 slides over the flat side 246A of the tip 246. The bumper 249 engages the receptacle 250 to serve as a cushion. (It is noted that bumpers 249 may also serve to attenuate vibration of the storage compartment 200.) At this point, the rear storage compartment 200 is secured in the horizontal position. To release the tip 246 from the receptacle 250, the rider need only move the handle 240 away from the rear main frame 110R to move the retaining member 254 out of engagement with the tip 246.

If the tip 246 of the compliant pin 242 does not initially register with the aperture 252 in the receptacle 250, the shaft 244 is designed to shift or tilt slightly so that the tip 246 will slide into the aperture 252. If the tip 246 is misaligned and encounters the periphery of the aperture 252, the shaft 244 will be forced upwardly against the force of the pre-loaded spring 243. Upon compression of the spring 243, the shaft 244 will tilt to achieve alignment with the aperture 252, as shown in FIG. 11. Furthermore, the tip 246 of the shaft 244 is tapered or cone shaped to facilitate the insertion of the tip 246 into the aperture 252. Once the tip 246 enters the aperture 252, the spring 243 expands causing the shaft 244 to return to its original orientation, which is normal to the cross support 217. It is noted that the springs 243 may also serve to attenuate vibration of the storage compartment 200.

Conventional four wheeled ATVs that have included a rear flat bed are prone to overturning, e.g., flipping up, when the ATV is driven through off-road terrain, especially if the vehicle was saddled with additional weight. However, the weight distribution, suspension and wheelbase of the ATV 100 in FIG. 2 reduces the likelihood of such mishaps, which will be discussed in detail below.

In particular, as illustrated in FIG. 5, a length L of the wheel base has been increased compared to a conventional ATV. The wheel base extends longitudinally from imaginary axis x1 to an imaginary axis x2, which axes are defined by the axles of the front and rear pairs of wheels. The wheel base has been extended to add stability to the ATV 100 so that it is more resistant to tipping over. The extended wheel base also helps to evenly distribute the load between the front and rear wheels. The ATV 100 has a 50/50 weight distribution over the front and rear wheels when unloaded. This provides a more stable platform for the rear storage compartment 200 so that the ATV can traverse uneven or off-road terrain. This is especially important when the ATV has been loaded with additional weight.

It is contemplated that, in order to provide greater stability of the ATV 100, the wheel base of the ATV may be extended by about 10 inches relative to a conventional ATV. Of course, the extension distance can be varied depending on the particular ATV application. In particular, the wheel base may be adjusted in order to correspondingly adjust the turning radius of the ATV. For example, the wheel base of the ATV 100 may be from 55 inches to 65 inches.

Further, the center of gravity of the rear storage compartment 200 is positioned so that it is centered on a rear axle 141 of the ATV 100, shown in FIG. 2. In FIG. 2, an arrow CG designates the center of gravity of the box bed 200. The rear storage compartment 200 is positioned above a pair of rear shock absorbers 155. The shock absorbers 155 are perpendicular to both the axle 141 and the flat floor portion 202 of the rear storage compartment 200. This overall architecture aids in evenly distributing the weight of the load and enables higher load capacity. Although the rear storage compartment 200 is described as having a substantially rectangular box shape, in keeping within the spirit of the invention, other configurations may be used.

The location and distribution of the weight of the various storage compartments will now be discussed. Generally, FIG. 2 illustrates the vehicle according to the invention including various additional storage compartments that are strategically designed and positioned so that the weight of the load is advantageously distributed. The novel design of the ATV 100 also allows it to be adaptable to contain several additional storage compartments.

Figure 13:
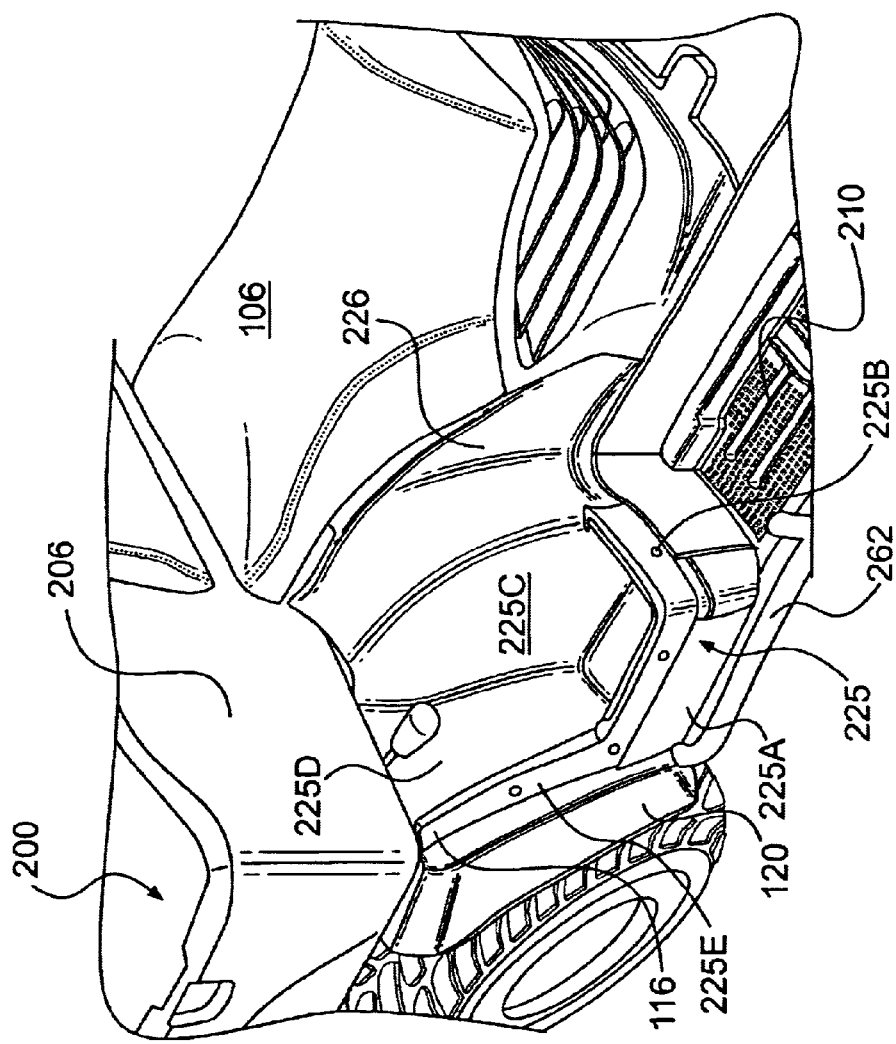
FIG. 13 is a partial front perspective view of the ATV shown in FIG. 2 illustrating a side storage compartment.

For example, a side compartment 225 may be provided on each lateral portion of the ATV 100. In one contemplated embodiment, shown in FIG. 13, each side compartment 225 may be formed integrally with respective rear fenders 116 for storage of additional materials within storage receptacles provided by the side compartments 225. As shown, the side compartments 225 are defined by a laterally outwardly facing wall portion 225A, spaced from an engine enclosure 226; a forwardly facing wall portion 225B, which is connected to and extends outwardly from the engine enclosure 226; a laterally facing wall portion 225C, which is provided by a portion of the engine enclosure 226; and a rearward wall portion 225D, which is provided by the rear fender structure 116. Additionally, the wall portion 225A may form a lip portion 225E that extends along the fender structure 116.

It is contemplated that the side compartments 225 may alternatively be formed integrally with the front fender 114 in a similar manner. It may also be possible to provide the side compartments 225 formed integrally with the rear fender 116, while an additional pair of side compartments (not shown) are formed integrally with the front fender 114.

Alternatively, instead of being integrally formed with the front or rear fenders 114, 116, the side compartments 225 may be manufactured so that they are detachably mounted to the front or rear fenders 114, 116 or the front main frame 110F. It is contemplated that the arrangement for detachably mounting the side compartments 225 may include, for example, VELCRO™, a pin-and-groove arrangement, or another similar attachment mechanism. In this manner, the side compartments 225, could be removed and used as portable storage containers. It is also contemplated that the side compartments 225 may be provided with lids or covers. For example, cover members may be provided that are removable from the side compartments 225 or are pivotally connected to the side compartments 225 so as to be pivoted open or closed.

The placement of loads within the side compartments 225 facilitates an even distribution of load on the ATV 100. The location of the side compartments 225 may be altered to correspondingly alter the distribution of load. For example, the side compartments 225 may be positioned at a relatively forward position to add weight to the forward portion of the ATV 100 (and vice-versa). Additionally, the side compartments 225 are preferably positioned relatively low on the ATV 100. In this manner, load may be placed within the side compartments 225 and thereby lower the center of gravity without compromising ground clearance of the ATV 100. This arrangement increases the stability of the ATV 100. Of course, the side compartments 225 may be positioned anywhere between the front and rear wheels 102, 104.

The additional storage compartments of the ATV 100 greatly increase the storage and load capacity of the vehicle. The location and the shape of the compartments are designed so that the weight of the cargo is strategically distributed. As discussed previously, the ATV 100 is arranged such that, when unloaded, there is a distribution of weight of the vehicle including approximately 50% of the weight on the front wheels 102 and approximately 50% of the weight on the rear wheels 104. The specific location and shape of the front rack 190, side compartments 225, and the rear compartment 200 (as well as the componetry of the ATV 100 itself) makes it possible to evenly distribute load over the vehicle to generally maintain the 50/50 weight distribution over the front and rear wheels 102, 104. The following is an example of a relatively evenly distributed load totaling 440 lbs. with five elements: a first element of 90 lbs. (approximately 20% of the total load) is positioned on the front rack; a second element of 20 lbs. (approximately 4.5% of the total load) is disposed within the fuel as fuel; and operator provides a third element of 200 lbs. (approximately 45% of the total load) and is situated on the seat 106; a fourth element of 30 lbs. (approximately 7% of the total load) is split between right and left side compartments 225; and a fifth element of 100 lbs. (approximately 23% of the total load) is situated within the rear storage compartment 200. Of course, other load distributions and placement of elements are possible.

Figure 12:
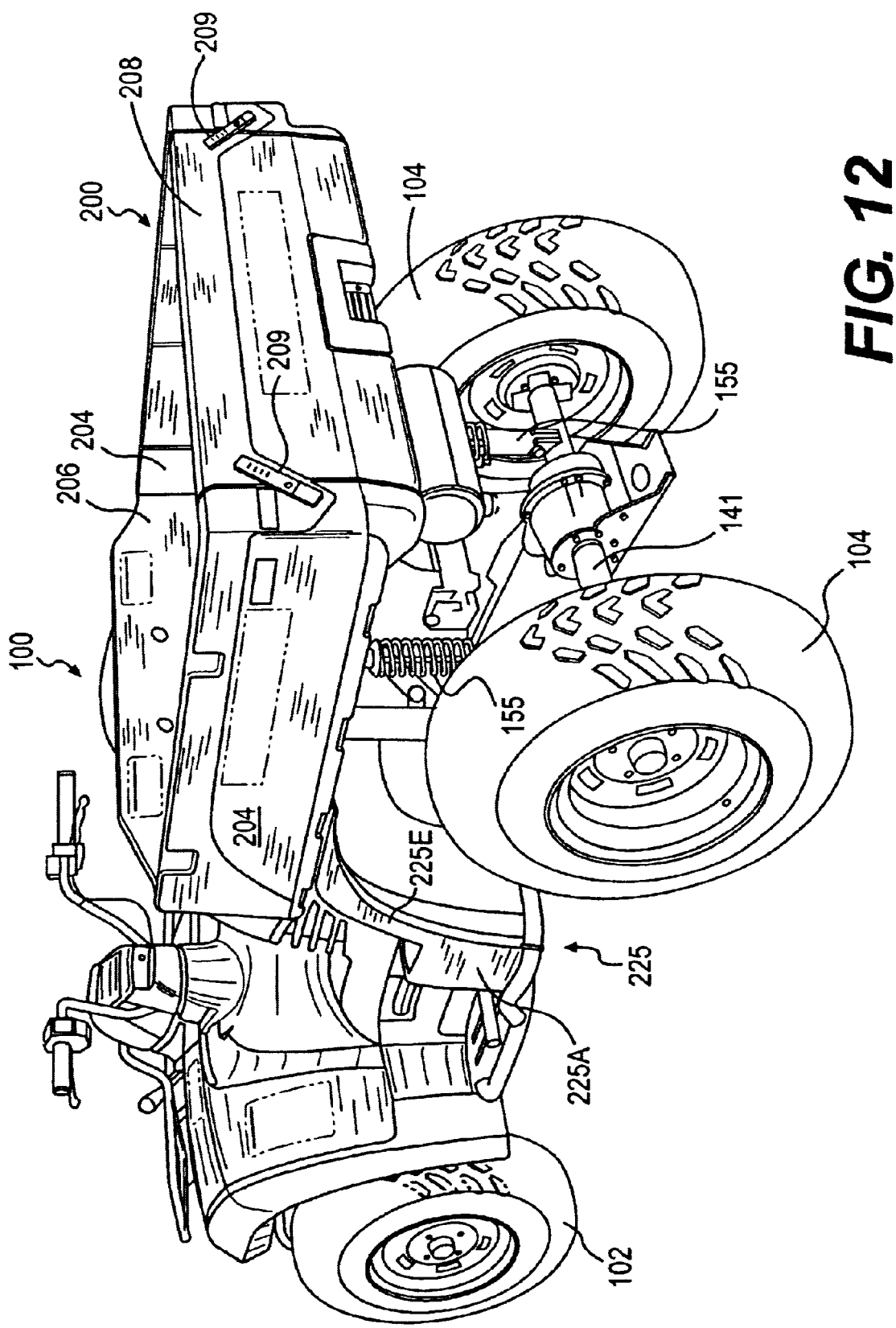
FIG. 12 is a rear perspective view of the ATV shown in FIG. 2.

Another embodiment of the invention relates to the shock absorber 155 shown in FIG. 12. One end of each shock absorber 155 is connected to the rear axle 141 and the other end is connected to the rear main frame 110R of the ATV 100. Alternatively, a single shock absorber 155 could be used at the rear, provided that it is located in a generally central location. As shown in FIG. 12, each shock absorber 155 is substantially perpendicular to the axle 141. Each shock absorber 155 is also perpendicular to the flat floor portion 202 of the rear storage compartment 200, as described.

Figure 14:
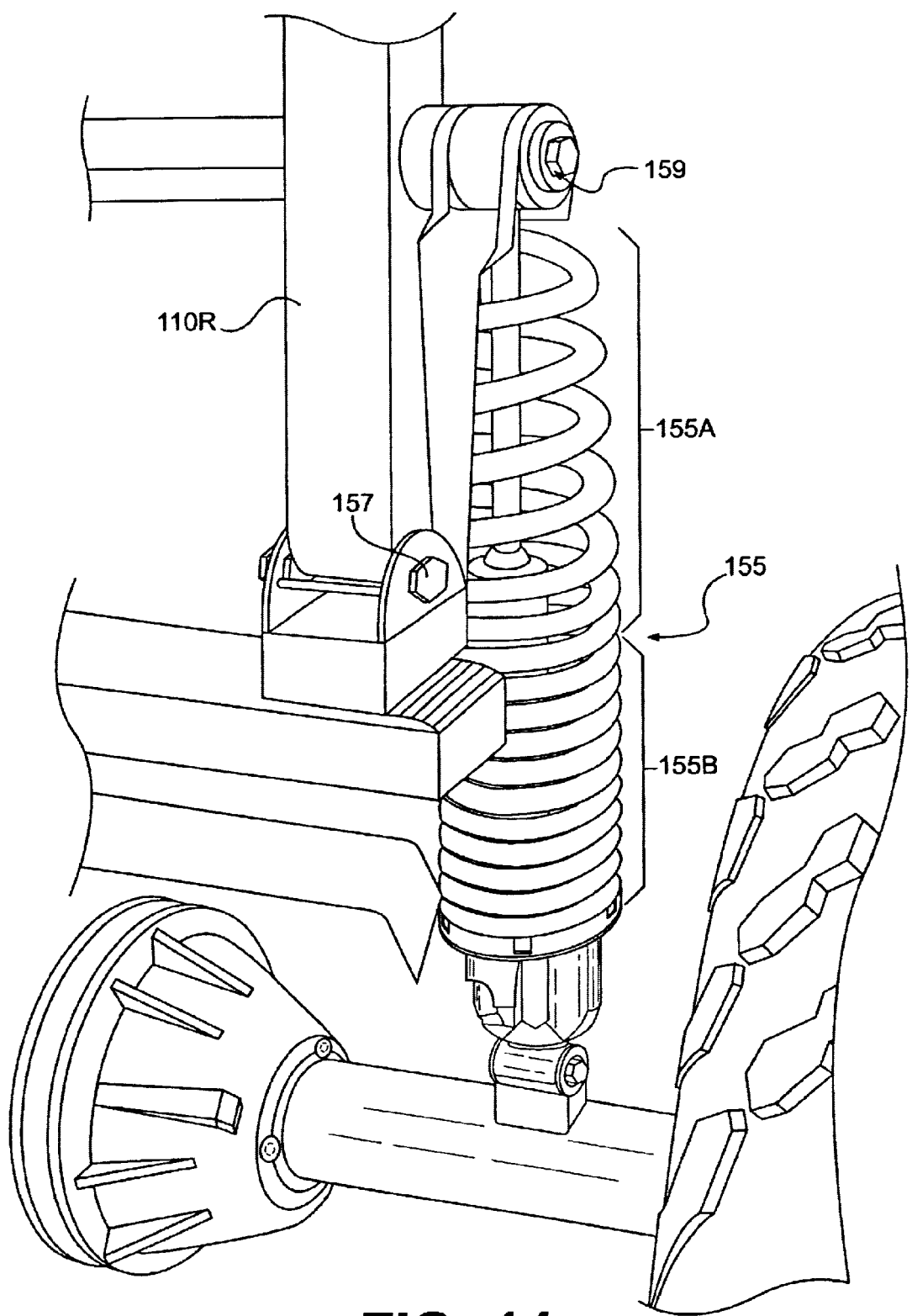
FIG. 14 is a detailed view of the right rear shock absorber according to the present invention.

As shown in FIG. 14, each shock absorber 155 includes a spring having a top portion 155a and a bottom portion 155b. The top portion 155a has loosely wound coils and the bottom portion 155b of each spring has tightly wound coils. During light loading or traveling on relatively smooth terrain, minor shocks are absorbed substantially by the loosely wound top coils 155a only. During heavy loading or traveling on rough terrain, heavy bumps are absorbed by both the top and bottom portions 155a, 155b. The spring is sometimes referred to as a dual-rate spring.

Figure 15:
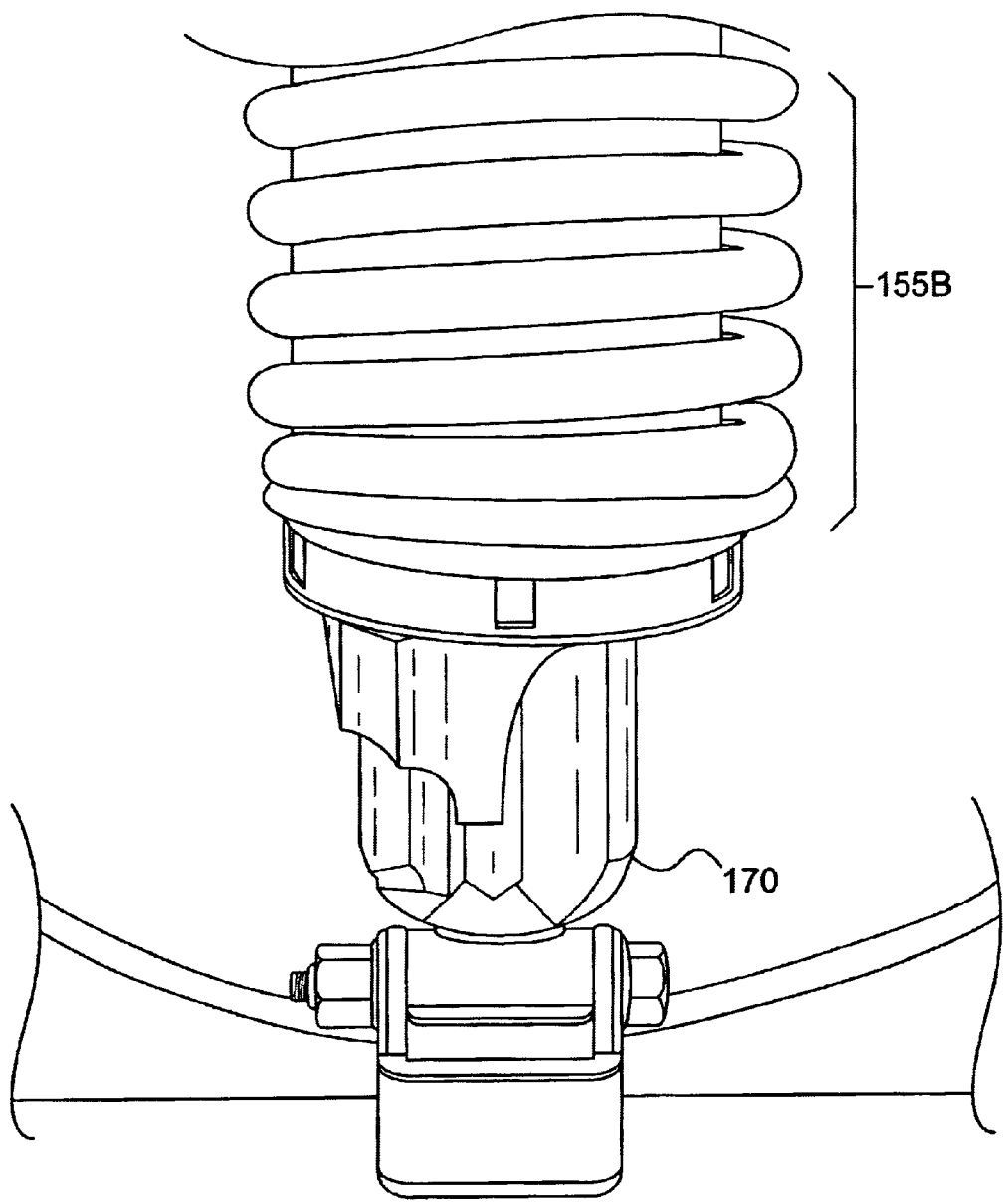
FIGS. 15 and 16 are detailed views of a cam mechanism according to the present invention in two different positions.
Figure 16:
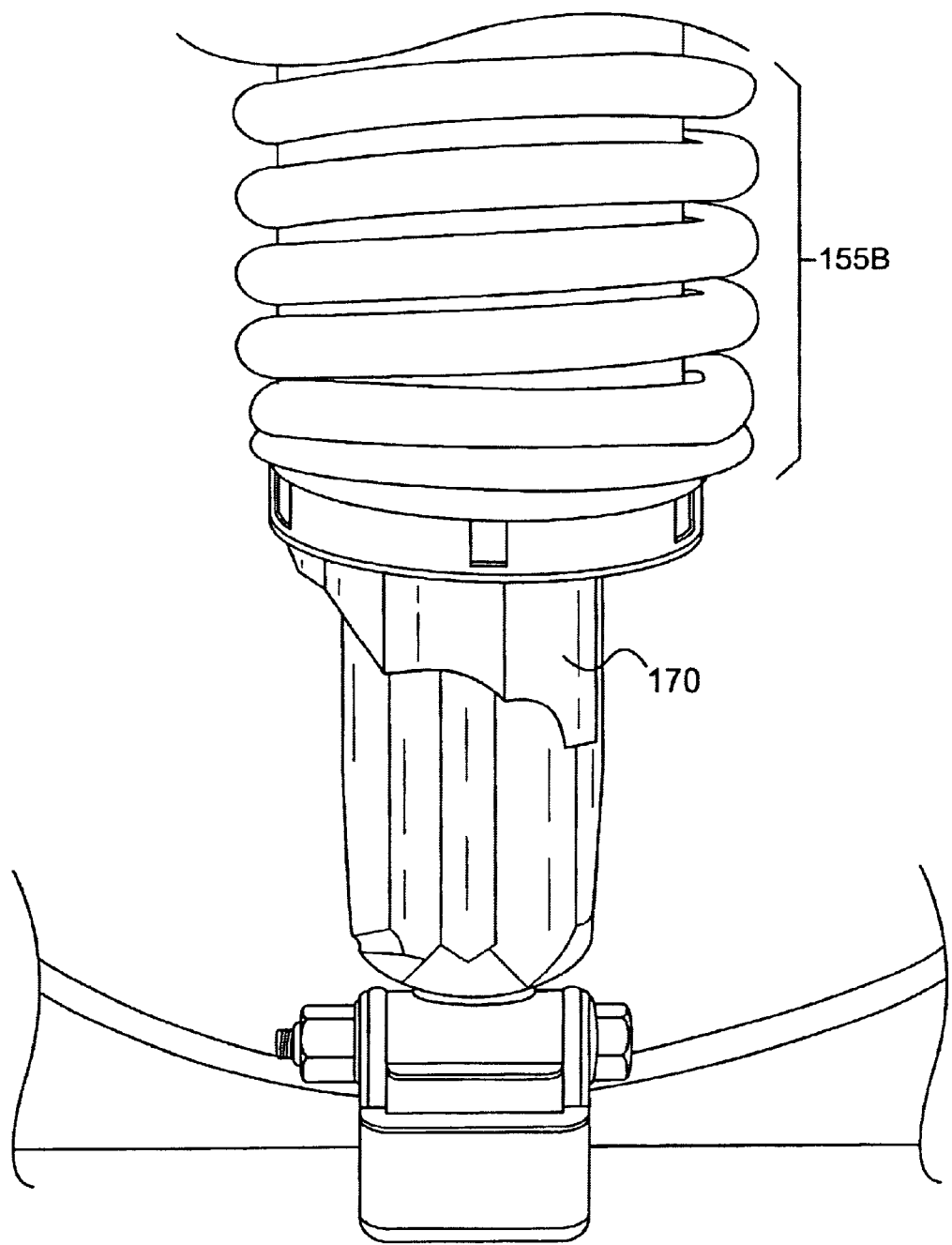

As shown in FIGS. 15 and 16, an adjustable cam 170 is mounted to a lower portion of each of the shock absorbers 155. In FIG. 15, the cam 170 is positioned to provide a relatively soft ride. In FIG. 16, the cam 170 has been rotated to compress the spring to provide a relatively firmer ride. In FIG. 16, the spacing between the coils has been decreased. The rotation of the cam 170 adjusts the tautness of the dual-rate springs, which in turn adjusts the ride of the rear suspension.

Full foot rests 210 (FIGS. 2, 4 and 17) are also provided on each side of the ATV 100, between the front and rear mudguards 118, 120. The full foot rests 210 provide increased comfort in contrast with the typical foot peg since the rider's weight is distributed over the entire bottom surface of the foot.

Figure 17:
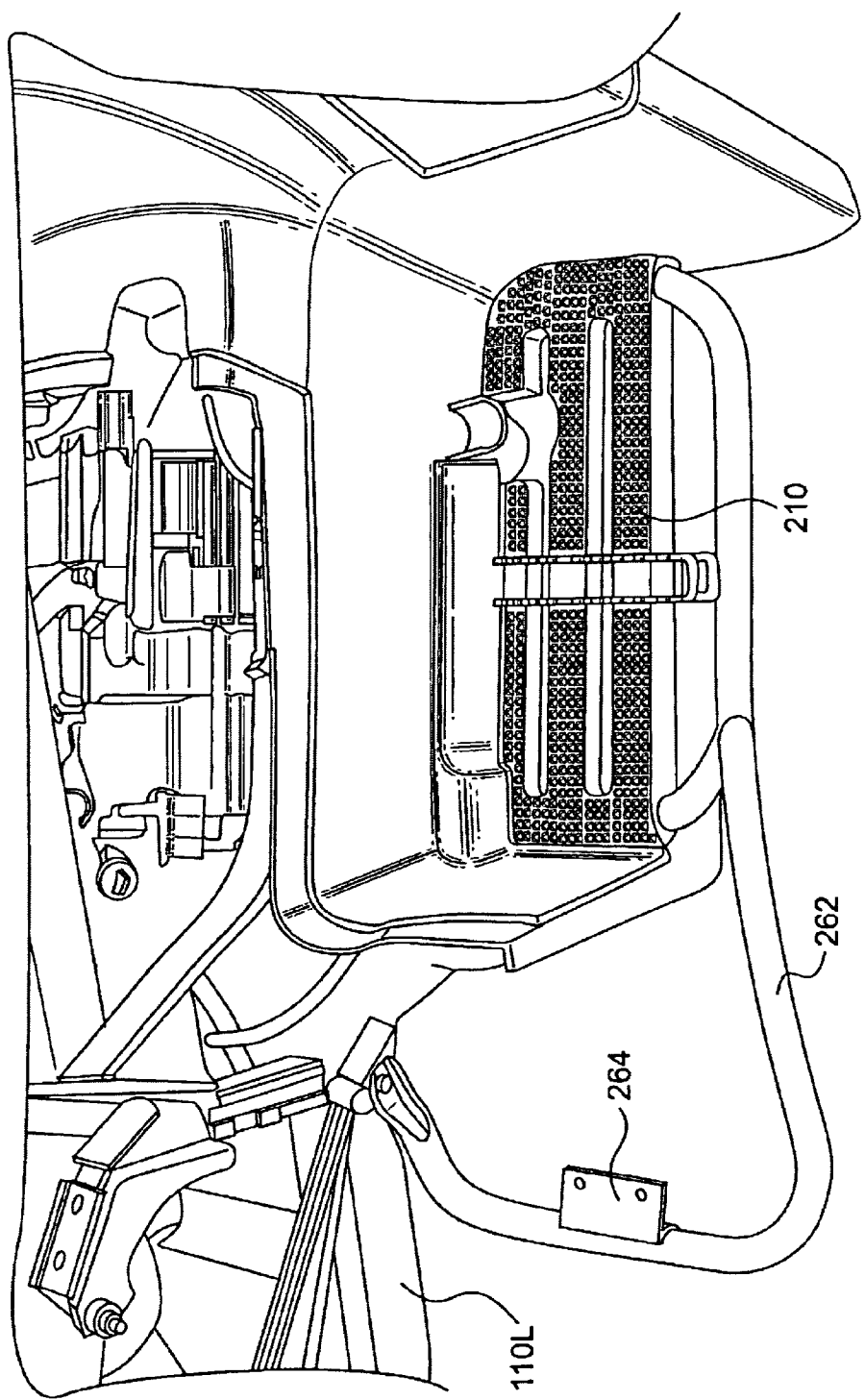
FIG. 17 is a partial top view of the tree guard according to the present invention, with the side storage compartment being removed.

The ATV 100 also has a tree guard 262 depicted in FIGS. 2, 5 and 17. With typical ATV vehicles, as they travel through densely populated forest, trees could knock the cargo off the vehicle or strike the rear storage compartment 200 or side compartments 225. However, the tree guard 262 protects the rear storage compartment 200 and its cargo, as well as the side compartments 225 and the rear fenders and mudguards. The tree guards 262 can be connected to a lower frame portion 110L and may be formed integrally with the foot rests 210, as shown in FIG. 17. The width of the tree guard 262 is at least equal to and preferably slightly wider than a width of the rear storage compartment 200. The tree guard 262 may be constructed from tubular or stamped members. Thus, as the vehicle travels through a forest or wooded area, the tree guards 262 impace the tree instead of the storage compartments 200 or 225. A portion 264 of the tree guard 262 may provide support for the side compartment 225.

Figure 18:
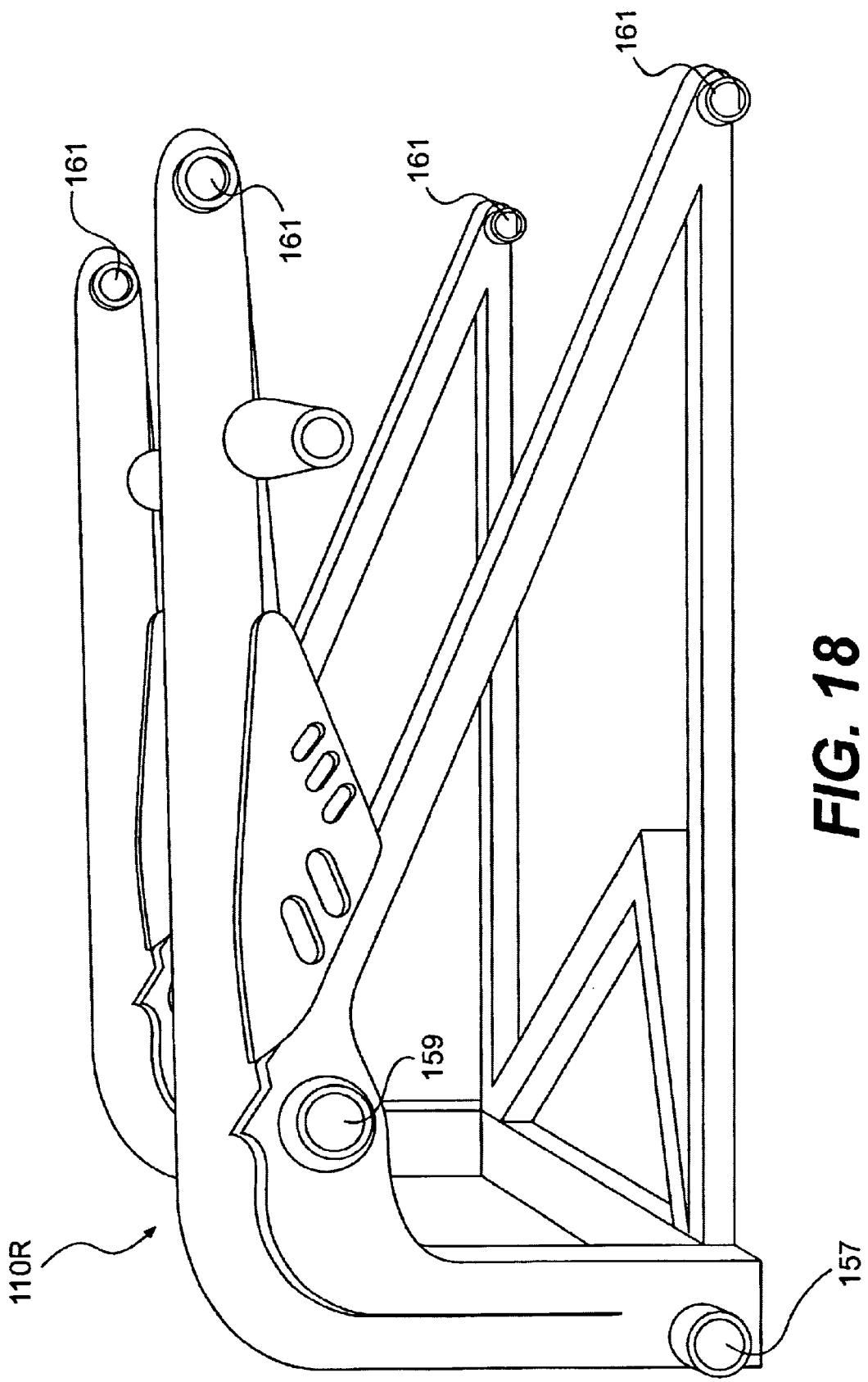
FIG. 18 is a side view of the rear main frame used with the ATV shown in FIG. 2, in its unattached condition.
Figure 19:
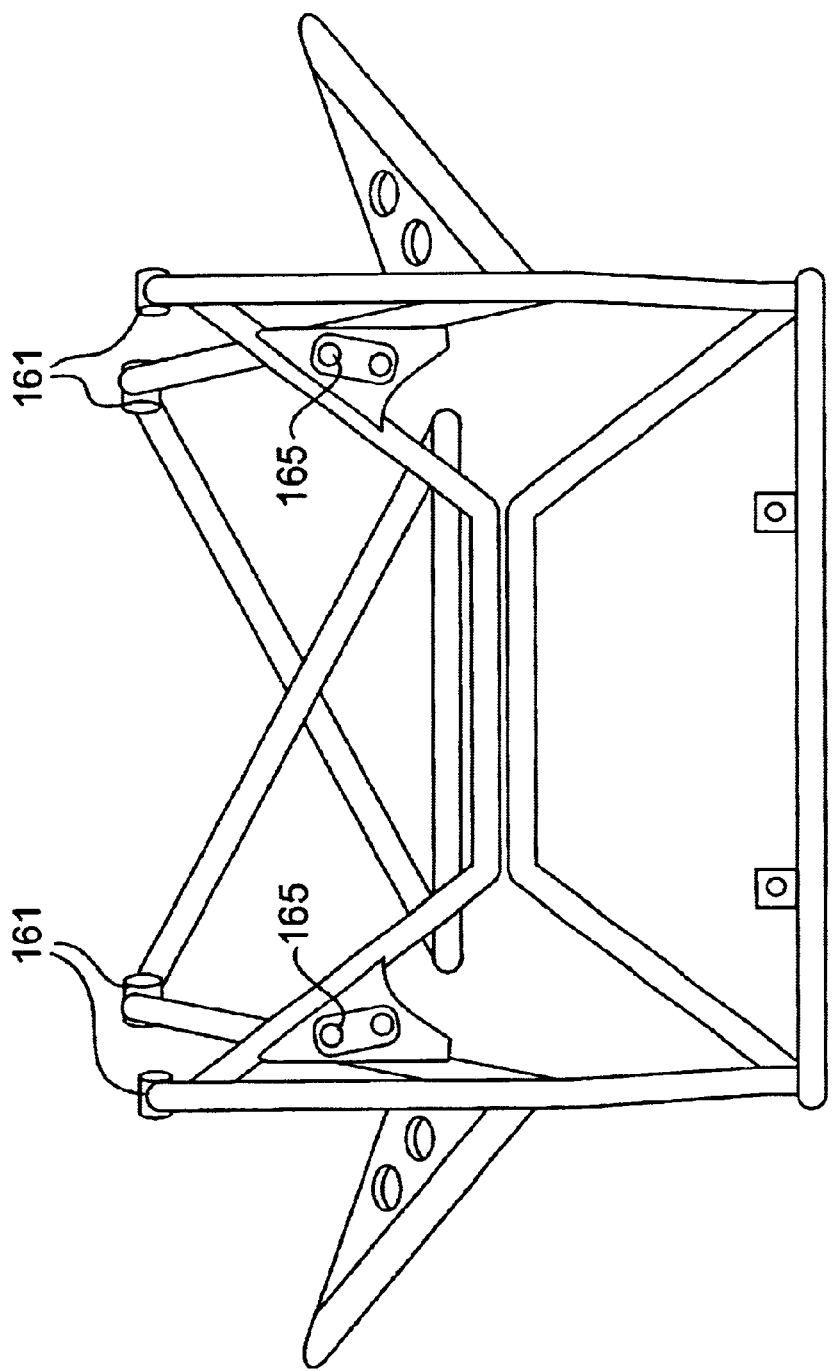
FIG. 19 is a top plan view of the rear main frame shown in FIG. 18.

It is contemplated that the overall frame of the ATV 100 may be unitary. However, another feature of the invention is that the overall frame of the ATV 100 frame may be split into the front main frame 110F (FIG. 3) and the rear main frame 110R. FIGS. 18 and 19 illustrate side and top plan views of the rear main frame 110R. The rear main frame 110R includes a fixed pivot point 157 about which the pivoting frame 235 (FIGS. 5–8) pivots. A plurality of connection points 161 are provided at the forward end of the rear main frame 110R. The connection points 161 connect to the front main frame 110F (FIG. 3). As shown in FIG. 19, a mounting plate 165 is provided for each receptacle 250 (FIG. 10). A mounting point 159 (FIGS. 14 and 18) provides an attachment point for the upper end of the shock absorber 155. The front main frame 110F includes an attachment point for each of the front shock absorbers. The connection points 161 between the front main frame 110F and the rear main frame 110R may be designed to intentionally break if a load exerted between the frame portions exceeds a predetermined limit. Stated differently, the joint may be provided with a mechanical "fuse". The joint breaks before the load causes any damage to either the front main frame 110F or the rear main frame 110R. One advantage to the split frame design is that if one portion of the frame suffers any structural damage it can be easily replaced or repaired without having to replace the undamaged portion of the frame.

As described, the front shock absorbers are attached to the front main frame 110F and the rear shock absorbers are attached to the rear main frame 110R. In contrast, the prior art vehicles typically attach the front and rear shock absorbers to a unitary main frame. Because the front main frame 110F and the rear main frame 110R are split, one of the frame members, e.g., the rear main frame 110R, can be replaced with another frame portion that has a different design or utility. For example, the rear main frame 110R, which pivotably supports the rear storage compartment 200, can be replaced with a different rear frame that is suitable for example the ATV described in the application cross-referenced above. Consequently, because the front main frame 110F does not change for most ATVs, the overall costs of the ATVs can be reduced since the same front main frame can be mass produced for use on a wide variety of ATVs. Moreover, the interchangeability of the frame parts permits the ATV to be easily fitted with new upgrades because only the newly-modified portion of the frame has to be changed out when new features are added or modifications are made to the vehicle. The front and rear main frames of the split-frame may be made of conventional construction and may be constructed from tubular or stamped members.

Furthermore, it is contemplated that the ATV 100 may be provided with four-wheel drive capability. For example, the ATV 100 may include a progressive differential of the type disclosed in co-pending U.S. application Ser. No. 09/339, 517, which has been incorporated by reference in its entirety. A progressive differential of this type may be used in the rear of the ATV coupled to the rear wheels 104 and/or may be used in the front of the ATV 100 coupled to the front wheels 102. The progressive differential provides the four-wheel drive capability of the ATV 100. The four-wheel drive capability may be advantageous for load carrying, and especially load carrying while traversing relatively rough terrain.

The above description of a preferred embodiment should not be interpreted in any limiting manner since variations and refinements are possible which are within the spirit and scope of the present invention.

What is claimed is:

1. A straddle-type vehicle comprising:

a frame;

a pair of front wheels suspended from a front portion of the frame and defining a front axle axis;

a pair of rear wheels suspended from a rear portion of the frame and defining a rear axle axis;

a straddle seat mounted on a central body portion of the vehicle;

a left foot rest disposed on a left side of the straddle seat and a right foot rest disposed on a right side of the straddle seat, wherein said left foot rest is arranged between the left front wheel and the left rear wheel and said right foot rest is arranged between the right front wheel and the right rear wheel;

a steering mechanism including a pair of handle bars provided to steer the pair of front wheels;

a pair of head lights mounted on a front body portion of the vehicle;

an engine mounted on the frame;

a front storage rack mounted on a front top body portion of the vehicle;

a rear storage compartment pivotably mounted to and disposed above the rear portion of the frame;

a pivoting frame that is pivotably connected to the frame, the pivoting frame including a pair of first links supporting the rear storage compartment, a pair of second links extending away from the pair of first links and pivotally coupled to the frame and cross-links transverse to and linking said pair of first links and adjacent to the rear storage compartment;

a piston assembly connected between the frame and the pivoting frame, said piston assembly being constructed and arranged to facilitate pivoting of the storage compartment, said piston assembly extending as the storage compartment is pivoted to an open, tilted position and retracting as the storage compartment is pivoted into a closed position;

a pair of receptacles provided on the frame; and a pair of pins associated with at least one of the cross-links in the pivoting frame, the pair of pins being insertable into a pair of apertures of the pair of receptacles, each one of said pair of pins comprising a shaft having first and second portions, said first portion having a conical tapered form, said second portion including a fixture for fastening the pin to the pivoting frame and a spring surrounding said shaft and arranged between said first portion and said second portion, wherein the rear storage compartment comprises:

a substantially flat portion to support a load;

a front wall portion connected to and extending upwardly with respect to the substantially flat portion, the front wall portion including a first side facing the substantially flat portion and a second side, opposite the first side, that faces the seat, the second side having a back seat rest attached thereto;

a pair of upwardly extending side wall portions facing each other and connected to said substantially flat portion and further connected to left and right portions of said front wall portion; and a rear wall portion hingedly connected to said substantially flat portion and moveable with respect to said side wall portions between an open position and a closed position.

2. The vehicle according to claim 1, wherein a wheelbase of the vehicle, defined as a length between the front axle axis carrying the pair of front wheels and the rear axle axis carrying the pair of rear wheels, is from 55 inches to 65 inches.

3. The vehicle according to claim 2, wherein said wheelbase of the vehicle is from 58 inches to 62 inches.

4. The vehicle according to claim 3, wherein said wheelbase of the vehicle is 58 inches.

5. The vehicle according to claim 2, wherein said rear storage compartment pivots about a pivot point located between a plane formed by the front wall portion and a plane formed by the rear wall portion of the rear storage compartment.

6. The vehicle according to claim 5, further comprising:

front and rear fender structures positioned over the front and rear wheels, respectively; and a side compartment structure coupled to the frame on each lateral side of the frame, one said side compartment structure being aligned between the left front wheel and the left rear wheel and another said side compartment structure being aligned between the right front wheel and the right rear wheel, wherein each said side compartment structure is configured to define a storage receptacle, including a bottom wall substantially at the same height as one of the left and right foot rests and a plurality of upstanding walls including a rear wall, a front wall, an inside wall, and an outside wall, the rear wall being formed as a part of the rear wheel fender structure, the inside wall being formed as part of a body of the vehicle, the front wall facing towards the front wheel fender.

7. The vehicle according to claim 6, further comprising:

at least one shock absorber connected to the frame and associated with a rear axle of the vehicle to provide dampening of vibrations, said shock absorber including a spring having top and bottom portions, wherein an adjustable cam is mounted to the bottom portion of the spring so as to adjust the compression of the spring.

8. The vehicle according to claim 6, wherein said shaft is tiltable to accommodate for misalignment between the first portion of the shaft and the aperture, wherein said spring is preloaded to maintain the shaft substantially perpendicular to one of the cross-links of the pivoting frame.

9. A straddle-type vehicle comprising:

a frame;

a pair of front wheels suspended from a front portion of the frame and defining a front axle axis;

a pair of rear wheels suspended from a rear portion of the frame and defining a rear axle axis;

a straddle seat mounted on a central body portion of the vehicle;

a left foot rest disposed on a left side of the straddle seat and a right foot rest disposed on a right side of the straddle seat, wherein said left foot rest is arranged between the left front wheel and the left rear wheel and said right foot rest is arranged between the right front wheel and the right rear wheel;

a steering mechanism including a pair of handle bars provided to steer the pair of front wheels;

a pair of head lights mounted on a front body portion of the vehicle;

an engine mounted on the frame;

a front storage rack mounted on a front top body portion of the vehicle;

front and rear fender structures positioned over the front and rear wheels, respectively; and a side compartment structure disposed on each lateral side of the frame, one said side compartment structure being aligned between the left front wheel and the left rear wheel and another said side compartment structure being aligned between the right front wheel and the right rear wheel, wherein each said side compartment structure is configured to define a storage receptacle, including a bottom wall substantially at the same height as one of the left and right foot rests and a plurality of upstanding walls including a rear wall, a front wall, an inside wall, and an outside wall, the rear wall being formed as a part of the rear wheel fender structure, the inside wall being formed as part of a body of the vehicle, the front wall facing towards the front wheel fender.

10. The straddle-type vehicle according to claim 9, wherein the power unit is configured so as to be capable of providing power to each of the front and rear pairs of wheels.

11. The straddle-type vehicle according to claim 10, wherein a wheelbase of the vehicle, defined as a length between the front axle carrying the pair of front wheels and the rear axle carrying the pair of rear wheels, is from 55 inches to 65 inches.

12. The straddle-type vehicle according to claim 11, further comprising:

at least one shock absorber connected to the rear portion of the frame and associated with the rear axle of the vehicle to provide dampening of vibrations, said shock absorber including a spring having top and bottom portions, wherein an adjustable cam is mounted to the bottom portion of the spring so as to adjust the compression of the spring.

13. The straddle-type vehicle according to claim 11, wherein said wheelbase of the vehicle is from 58 inches to 62 inches.

14. The straddle-type vehicle according to claim 13, wherein said wheelbase of the vehicle is 58 inches.

15. The straddle-type vehicle according to claim 1, further comprising:

a rear storage compartment pivotably mounted to and disposed above the rear portion of the frame; and a pivoting frame that is pivotably connected to the frame, the pivoting frame including a pair of first links supporting the rear storage compartment, a pair of second links extending away from the pair of first links and pivotally coupled to the frame and cross-links linking said pair of first links.

16. The straddle-type vehicle according to claim 15, further comprising:

a pair of pins associated with at least one of the cross-links, each of the pins comprising a shaft having a distal end with a tapered tip and a proximal end coupled to one of said cross-links; and a pair of receptacles mounted on the frame, each of the pair of receptacles including an aperture that receives a respective one of the tapered tips of the pair of pins.

17. The straddle-type vehicle according to claim 16, wherein each said pin is tiltable to accommodate for misalignment between the distal end of the pin and the aperture, wherein a spring is provided between said distal and proximal ends of the shaft, said spring being preloaded to maintain the pin substantially perpendicular to one of the cross-links of the pivoting frame.

18. A straddle-type vehicle comprising:

a frame;

a pair of front wheels suspended from a front portion of the frame and defining a front axle axis;

a pair of rear wheels suspended from a rear portion of the frame and defining a rear axle axis;

a straddle driver seat mounted on a central body portion of the vehicle;

a back rest positioned rearward of the driver seat;

a driver left foot rest disposed on a left side of the straddle driver seat and a driver right foot rest disposed on a right side of the driver straddle seat, wherein said driver left foot rest is arranged between the left front wheel and the left rear wheel and said driver right foot rest is arranged between the right front wheel and the right rear wheel;

a steering mechanism including a pair of handle bars provided to steer the pair of front wheels;

a pair of head lights mounted on a front body portion of the vehicle;

an engine mounted on the frame;

a front storage rack mounted on a front top body portion of the vehicle;

a rear section disposed above the rear portion of the frame, said rear section comprising a first support surface disposed rearward of the driver seat, at least a portion of the first support surface being positioned forwardly of the rear wheel axle axis;

front left, front right, rear left, and rear right fender structures positioned over front left, front right, rear left and rear left wheels, respectively; and left and right side generally horizontal supplemental support surfaces positioned on left and right sides of the frame, said left and right side supplemental supports being disposed in a plane below a plane containing the first support surface, said left side supplemental support surface being aligned between the left front wheel and the left rear wheel and said right side supplemental support surface being aligned between the right front wheel and the right rear wheel, said left side supplemental support surface being disposed between the rear left wheel fender structure and the driver left foot rest and said right side supplemental support surface being disposed between the rear right wheel fender and the driver right foot rest, wherein a wheelbase of the vehicle, defined as a length between the front axle axis carrying the pair of front wheels and the rear axle axis carrying the pair of rear wheels, is from 55 inches to 65 inches.

19. The straddle-type vehicle according to claim 18, wherein said back rest is mounted so as to be pivotable about a pivot axis parallel to the rear axle axis and the pivot axis is positioned rearward of the rear axle axis.

20. The straddle-type vehicle according to claim 15, wherein the power unit is configured so as to be capable of providing power to each of the front and rear pairs of wheels.

21. The straddle-type vehicle according to claim 20, wherein said wheelbase of the vehicle is from 58 inches to 62 inches.

22. The straddle-type vehicle according to claim 21, wherein said wheelbase of the vehicle is 58 inches.

23. A straddle-type vehicle comprising:

a frame;

a pair of front wheels suspended from a front portion of the frame and defining a front axle axis;

a pair of rear wheels suspended from a rear portion of the frame and defining a rear axle axis;

a straddle driver seat mounted on a central body portion of the vehicle;

a back rest positioned rearward of the driver seat;

a driver left foot rest disposed on a left side of the straddle driver seat and a driver right foot rest disposed on a right side of the driver straddle seat, wherein said driver left foot rest is arranged between the left front wheel and the left rear wheel and said driver right foot rest is arranged between the right front wheel and the right rear wheel;

a steering mechanism including a pair of handle bars provided to steer the pair of front wheels;

a pair of head lights mounted on a front body portion of the vehicle;

an engine mounted on the frame;

a front storage rack mounted on a front top body portion of the vehicle;

a rear section disposed above the rear portion of the frame, said rear section comprising a first support surface disposed rearward of the driver seat, at least a portion of the first support surface being positioned forwardly of the rear wheel axle axis;

front left, front right, rear left, and rear right fender structures positioned over front left, front right, rear left and rear left wheels, respectively; and left and right side generally horizontal supplemental support surfaces positioned on left and right sides of the frame, said left and right side supplemental supports being disposed in a plane below a plane containing the first support surface, said left side supplemental support surface being aligned between the left front wheel and the left rear wheel and said right side supplemental support surface being aligned between the right front wheel and the right rear wheel, said left side supplemental support surface being disposed between the rear left wheel fender structure and the driver left foot rest and said right side supplemental support surface being disposed between the rear right wheel fender and the driver right foot rest, wherein a wheelbase of the vehicle, defined as a length between the front axle axis carrying the pair of front wheels and the rear axle axis carrying the pair of rear wheels, is from 55 inches to 65 inches, and wherein each of the left and right supplemental support surfaces defines a bottom surface of a side storage compartment positioned between the front and rear fenders and in substantial alignment with the left and right footrests.

24. A straddle-type vehicle comprising:

a frame;

a pair of front wheels suspended from a front portion of the frame and defining a front axle axis;

a pair of rear wheels suspended from a rear portion of the frame and defining a rear axle axis;

a straddle driver seat mounted on a central body portion of the vehicle;

a back rest positioned rearward of the driver seat;

a driver left foot rest disposed on a left side of the straddle driver seat and a driver right foot rest disposed on a right side of the driver straddle seat, wherein said driver left foot rest is arranged between the left front wheel and the left rear wheel and said driver right foot rest is arranged between the right front wheel and a right rear wheel;

a steering mechanism including a pair of handle bars provided to steer the pair of front wheels;

a pair of head lights mounted on a front body portion of the vehicle;

an engine mounted on the frame;

a front storage rack mounted on a front top body portion of the vehicle;

a rear section disposed above the rear portion of the frame, said rear section comprising a first support surface disposed rearward of the driver seat, at least a portion of the first support surface being positioned forwardly of the rear wheel axle axis;

front left, front right, rear left, and rear right fender structures positioned over front left, front right, rear left and rear left wheels, respectively;

left and right side generally horizontal supplemental support surfaces positioned on left and right sides of the frame, said left and right side supplemental supports being disposed in a plane below a plane containing the first support surface, said left side supplemental support surface being aligned between the left front wheel and the left rear wheel and said right side supplemental support surface being aligned between the right front wheel and the right rear wheel, said left side supplemental support surface being disposed between the rear left wheel fender structure and the driver left foot rest and said right side supplemental support surface being disposed between the rear right wheel fender and the driver right foot rest;

a unitary rail member disposed adjacent each of the right and left foot rests, each said unitary rail member spanning a combined length of the respective foot rest and its associated supplemental support surface, and wherein a wheelbase of the vehicle, defined as a length between the front axle axis carrying the pair of front wheels and the rear axle axis carrying the pair of rear wheels, is from 55 inches to 65 inches.

25. The vehicle according to claim 24, wherein each of the left and right supplemental support surfaces defines a bottom surface of a side storage compartment positioned between the front and rear fenders and in substantial alignment with the left and right footrests.

26. A straddle-type vehicle comprising:

a frame;

a pair of front wheels suspended from a front portion of the frame;

a pair of rear wheels suspended from a rear portion of the frame and defining a rear axle;

a power unit mounted on the frame; and a rear storage compartment pivotally mounted to and disposed above the rear portion of the frame, the rear storage compartment having a center of gravity positioned over the rear axle;

a fender positioned over the front or rear wheels; and at least one side compartment provided to the fender, the side compartment being positioned between the front and rear wheels.

27. The vehicle according to claim 26, wherein the at least one side compartment is formed in one piece with the fender.

28. The vehicle according to claim 26, further comprising a front storage rack and a front storage compartment.

29. The vehicle according to claim 28, wherein a weight of the vehicle is evenly distributed between the front wheels and the rear wheels.

30. A straddle-type vehicle comprising:

a frame;

a pair of front wheels suspended from a front portion of the frame;

a pair of rear wheels suspended from a rear portion of the frame;

a power unit mounted on the frame;

a seat positioned over the power unit;

a rear storage compartment positioned over the rear portion of the frame;

a front storage rack and compartment positioned adjacent the front wheels; and a side compartment on each side of the seat, each side compartment being positioned between the front and rear wheels, wherein the rear storage compartment, the front storage rack and compartment and the side compartment provide an even distribution of load between the front and rear pairs of wheels.

31. The vehicle according to claim 30, wherein the power unit is configured so as to be capable of providing power to each of the front and rear pairs of wheels.

32. A straddle-type vehicle comprising:

a frame;

a pair of front wheels suspended from a front portion of the frame;

a pair of rear wheels suspended from a rear portion of the frame;

a power unit mounted on the frame; and at least one side compartment structure coupled to the frame on a lateral side of the frame between the pairs of front and rear wheels, wherein the side compartment structure is configured to define a storage receptacle.

33. The vehicle according to claim 32, further comprising a rear fender structure mounted to the frame, the at least one side compartment structure having a rear wall that is integrally formed with the rear fender structure.

34. The vehicle according to claim 32, wherein the at least one side compartment structure is configured to hold about 15 pounds therein.

35. The vehicle according to claim 32, wherein the at least one side compartment structure is aligned with one of a left and right one of the pairs of front and rear wheels.

36. The vehicle according to claim 32, wherein the power unit is configured to provide power to each of the front and rear pairs of wheels.

37. The vehicle according to claim 32, wherein the at least one side compartment structure includes a bottom wall and a plurality of upstanding walls.

38. The vehicle according to claim 37, wherein the plurality of walls includes a rear wall, a front wall, an inside wall, and an outside wall.

39. The vehicle according to claim 38, wherein the front and outside walls are shorter than the rear and inside walls.

40. The vehicle according to claim 38, wherein the inside wall is formed as part of an engine enclosure wall.

41. The vehicle according to claim 38, wherein the rear wall is formed as part of a fender structure.

* * * * *